US012224144B2

(12) United States Patent
Bergamini et al.

(10) Patent No.: US 12,224,144 B2
(45) Date of Patent: Feb. 11, 2025

(54) SWITCHING APPARATUS FOR ELECTRIC GRIDS

(71) Applicant: ABB S.p.A., Milan (IT)

(72) Inventors: Alessio Bergamini, Bergamo (IT); Nicola Bresciani, Bergamo (IT)

(73) Assignee: ABB S.p.A., Milan (IT)

( * ) Notice: Subject to any disclaimer, the term of this patent is extended or adjusted under 35 U.S.C. 154(b) by 249 days.

(21) Appl. No.: 17/860,260

(22) Filed: Jul. 8, 2022

(65) Prior Publication Data

US 2023/0010157 A1 Jan. 12, 2023

(30) Foreign Application Priority Data

Jul. 12, 2021 (EP) .................................... 21185085

(51) Int. Cl.
*H01H 33/42* (2006.01)
*H01H 71/02* (2006.01)
(Continued)

(52) U.S. Cl.
CPC .......... *H01H 71/128* (2013.01); *H01H 33/42* (2013.01); *H01H 71/02* (2013.01); *H01H 71/52* (2013.01)

(58) Field of Classification Search
CPC ...... H01H 71/128; H01H 33/42; H01H 71/02; H01H 71/52; H01H 1/14; H01H 3/46; H01H 33/596; H01H 33/06; H01H 3/32
(Continued)

(56) References Cited

U.S. PATENT DOCUMENTS 2,388,251 A * 11/1945 Coe ....................... B21B 21/005
72/208
3,129,307 A 4/1964 De Vargas
(Continued)

FOREIGN PATENT DOCUMENTS

DE 4341158 A1 6/1994
DE 10064525 A1 6/2002
(Continued)

OTHER PUBLICATIONS

Extended European Search Report for European Application No. 21185085.4, dated Apr. 1, 2022, 8 pages.

*Primary Examiner* — Mohamad A Musleh
*Assistant Examiner* — Lisa N Homza
(74) *Attorney, Agent, or Firm* — McCarter & English, LLP

(57) ABSTRACT

Described herein is a switching apparatus for low or medium voltage electric grids, which includes one or more electric poles. Each electric pole includes: an outer casing defining an internal volume of the electric pole; a fixed contact assembly accommodated in the internal volume of the electric pole and including a fixed contact member extending along a longitudinal axis of the electric pole; at least one movable contact assembly accommodated in the internal volume of the electric pole; an actuation member accommodated in the internal volume of the electric pole and arranged coaxially and externally relative to the fixed contact member, so that the fixed contact member passes through the actuation member along the longitudinal axis. The actuation member is slidingly movable along the fixed contact member. When moving between the first and second actuation positions, the actuation member transiently couples to each trip mechanism to actuate the trip mechanism.

15 Claims, 23 Drawing Sheets

(51) Int. Cl.
*H01H 71/12* (2006.01)
*H01H 71/52* (2006.01)

(58) Field of Classification Search
USPC .......................................................... 335/172
See application file for complete search history.

(56) References Cited

U.S. PATENT DOCUMENTS

| | | | | |
|---|---|---|---|---|
| 4,118,608 A * | 10/1978 | Kussy | H01H 71/04 200/50.05 |
| 2022/0223361 A1* | 7/2022 | Morelli | H01H 33/662 |
| 2023/0368995 A1* | 11/2023 | Invernizzi | H01H 33/126 |

FOREIGN PATENT DOCUMENTS

| | | | |
|---|---|---|---|
| EP | 2523203 | A1 | 11/2012 |
| EP | 3624159 | A1 | 3/2020 |
| WO | 02093600 | A1 | 11/2002 |
| WO | 2017005474 | A1 | 1/2017 |

* cited by examiner

| Pole element | Position |
|---|---|
| Movable contact member 5 | Coupled position P1 |
| Trip mechanism 6 | First trip position P3 |
| Actuation member 7 | First actuation position P5 |
| First lever 61 | First rotation position P7 |

P1, P3, P5, P7

P1, P3, P5, P7

| Pole element | Position |
|---|---|
| Movable contact member 5 | Uncoupled position P2 |
| Trip mechanism 6 | Second trip position P4 |
| Actuation member 7 | Second actuation position P6 |
| First lever 61 | Second rotation position P8 |

P8

P1, P3, P5, P7

SWITCHING APPARATUS FOR ELECTRIC GRIDS

CROSS-REFERENCE TO RELATED APPLICATION

This application claims priority to European Patent Application No. 21185085.4, filed Jul. 12, 2021, and titled "A SWITCHING APPARATUS FOR ELECTRIC GRIDS", which is hereby incorporated by reference in its entirety.

BACKGROUND

The present disclosure relates to the field of electric grids. More particularly, the present disclosure relates to a switching apparatus for electric grids, for example DC electric grids.

As it is known, an electric grid normally includes a number of switching apparatuses configured in such a way to allow a selective disconnection of portions of electric grid, for example when a fault event occurs.

Many switching apparatuses of the state of the art are of electromechanical type.

In general, these switching apparatuses have the advantage of ensuring a galvanic isolation between disconnected grid portions. Additionally, they are relatively cheap to realize at industrial level.

However, experience has shown that these apparatuses do not often provide satisfactory interruption ratings, in particular when they have to interrupt DC currents at relatively high voltages (e.g. up to 1 kV DC or above). In these circumstances, in fact, their opening time can be quite long. Electric arcs, which usually strike between electric contacts under separation, may consequently last for a relatively long time, which is quite dangerous as many electrical components (e.g. photovoltaic panels and energy storage systems) electrically connected to the electric line can potentially feed an undergoing electric fault.

The above-mentioned technical issues are particularly relevant from an industrial point of view as DC electric grids are now widely adopted in a variety of applications and many DC electric grids (e.g. those employed in photovoltaic plants or naval systems) are designed to operate at relatively high voltage levels (e.g. about 1.5 kV DC or above).

BRIEF DESCRIPTION

The present disclosure provides a switching apparatus for electric grids, in particular DC electric grids, which allows overcoming or mitigating the above-mentioned criticalities.

More particularly, the present disclosure provides a switching apparatus ensuring performant interruption ratings in case of electric faults, especially in presence of short-circuit currents.

The present disclosure also provides a switching apparatus having a compact structure and that is easy to install on the field.

Further, the present disclosure provides a switching apparatus, which can be easily manufactured at industrial level, at competitive costs relative to the solutions of the state of the art.

In a general definition, the switching apparatus of the present disclosure, includes one or more electric poles, each of which includes:

- an outer casing made of electrically insulating material and defining an internal volume of said electric pole;
- a fixed contact assembly accommodated in the internal volume of said electric pole and including a fixed contact member formed by an electrically conductive tubular element extending along a longitudinal axis of said electric pole;
- at least a movable contact assembly accommodated in the internal volume of said electric pole and hanging laterally relative to said fixed contact member.

Each movable contact assembly includes at least a movable contact member reversibly movable, about a first rotation axis, between a coupled position, at which a first contact surface of said movable contact member is coupled with a corresponding second contact surface of said fixed contact member, and an uncoupled position, at which the first contact surface of said movable contact member is separated from the second contact surface of said fixed contact member.

Each movable contact assembly includes at least a trip mechanism coupled to at least a movable contact member. Said trip mechanism is reversibly movable between a first trip position and a second trip position.

Said trip mechanism moves said movable contact member from said coupled position to said uncoupled position when said trip mechanism moves from said first trip position to said second trip position, upon receiving an actuation force.

Said trip mechanism moves said movable contact member from said uncoupled position to said coupled position when said trip mechanism moves from said second trip position to said first trip position, upon receiving an actuation force.

Each electric pole further includes an actuation member accommodated in the internal volume of said electric pole and formed by an electrically insulating hollow tubular element arranged coaxially and externally relative to said fixed contact member, so that said fixed contact member passes through said actuation member along said longitudinal axis.

Said actuation member is slidingly movable along said fixed contact member.

In particular, said actuation member is reversibly movable between a first actuation position and a second actuation position by sliding along said fixed contact member.

When moving between said first and second actuation positions, said actuation member transiently couples to each trip mechanism to actuate said trip mechanism between said first and second trip positions.

Said actuation member may transiently couple to each trip mechanism and may provide an actuation force to move said trip mechanism from said first trip position to said second trip position, when said actuation member moves from said first actuation position to said second actuation position.

Said actuation member may transiently couple to each said trip mechanism and may provide an actuation force to move said trip mechanism from said second trip position to said first trip position, when said actuation member moves from said second actuation position to said first actuation position.

An insulating portion of said actuation member may be interposed between a contact surface of each movable contact member and a corresponding contact surface of said fixed contact member, when said actuation member is in said second actuation position.

The switching apparatus of the present disclosure may include actuation means for actuating the actuation member of each electric pole.

Each electric pole may include a motion transmission member coupled to said actuation means and to said actuation member to transmit an actuation force to said actuation member.

According to an aspect of the present disclosure, each trip mechanism includes a kinematic chain including:

a first lever reversibly movable about a second rotation axis and arranged in such a way to be actuated by said actuation member, when said actuation member moves between said first and second actuation positions;

a second lever coupled to said first lever and to a movable contact member. Said second lever transmits an actuation force to said movable contact member to move said movable contact member between said coupled and uncoupled positions, when said first lever is actuated by said actuation member.

According to some embodiments of the present disclosure, said first lever includes a first arm and a second arm that are angularly spaced one from another along a reference plane parallel to said longitudinal axis. In this case, said actuation member includes an actuation protrusion, which transiently couples to said first arm to actuate said first lever, when said actuation member moves from said first actuation position to said second actuation position, and which transiently couples to said second arm to actuate said first lever, when said actuation member moves from said second actuation position to said first actuation position.

According to some embodiments of the present disclosure, said actuation member includes, for each trip mechanism, a first actuation protrusion and a second actuation protrusion for coupling with said first lever. Said first and second protrusions are spaced one from another along said longitudinal axis.

Said first lever is actuated by said first actuation protrusion, when said actuation member moves from said first actuation position to said second actuation position, and it is actuated by said second actuation protrusion, when said actuation member moves from said second actuation position to said first actuation position.

According to an aspect of the present disclosure, each trip mechanism includes tripping means providing an actuation force to trip said movable contact member towards said coupled position or towards said uncoupled position, when said movable contact member moves past a deadlock position, while travelling between said coupled and uncoupled positions.

Each electric pole may include a plurality of movable contact assemblies equally spaced around said fixed contact member.

According to some embodiments of the present disclosure, each movable contact assembly includes a pair of movable contact members movable in parallel around a same first rotation axis.

According to other embodiments of the present disclosure, each movable contact assembly includes a single movable contact member movable around a corresponding first rotation axis.

Each movable contact assembly may include a trip mechanism for each movable contact member.

Each movable contact assembly may include a supporting frame to hold in position each movable contact member and each trip mechanism of said movable contact assembly. Said supporting frame is fixed to a supporting structure fixed to said outer casing.

Conveniently, said motion transmission member passes through a slot of said outer casing and is coupled with said actuation means.

According to an aspect of the present disclosure, each electric pole includes deformable covering means driven by said motion transmission member for obstructing one or more portions of said slot of said outer casing, which are not occupied by said motion transmission member.

BRIEF DESCRIPTION OF THE DRAWINGS

Further characteristics and advantages of the present disclosure will become more apparent from the detailed description of embodiments illustrated only by way of non-limitative example in the accompanying drawings, in which.

DETAILED DESCRIPTION

With reference to the cited figures, the present disclosure relates to a switching apparatus 1 for electric grids.

The switching apparatus 1 is particularly suitable for use in low-voltage DC electric grids and it will be described hereinafter with particular reference to these applications for the sake of brevity only, without intending to limit the scope of the present disclosure in any way.

The switching apparatus 1 may, in fact, be successfully used in electric systems of different type, such as low-voltage AC electric grids or medium-voltage AC or DC electric grids.

For the purpose of the present application, the term “low-voltage” (LV) relates to operating voltages lower than 1 kV AC and 1.5 kV DC whereas the term “medium-voltage” (MV) relates to operating voltages higher than 1 kV AC and 1.5 kV DC up to some tens of kV, e.g. up to 72 kV AC and 100 kV DC.

The switching apparatus 1 may be a circuit-breaker. However, in principle, it may be of different type, for example a contactor, a disconnector, or the like.

Figure 22:
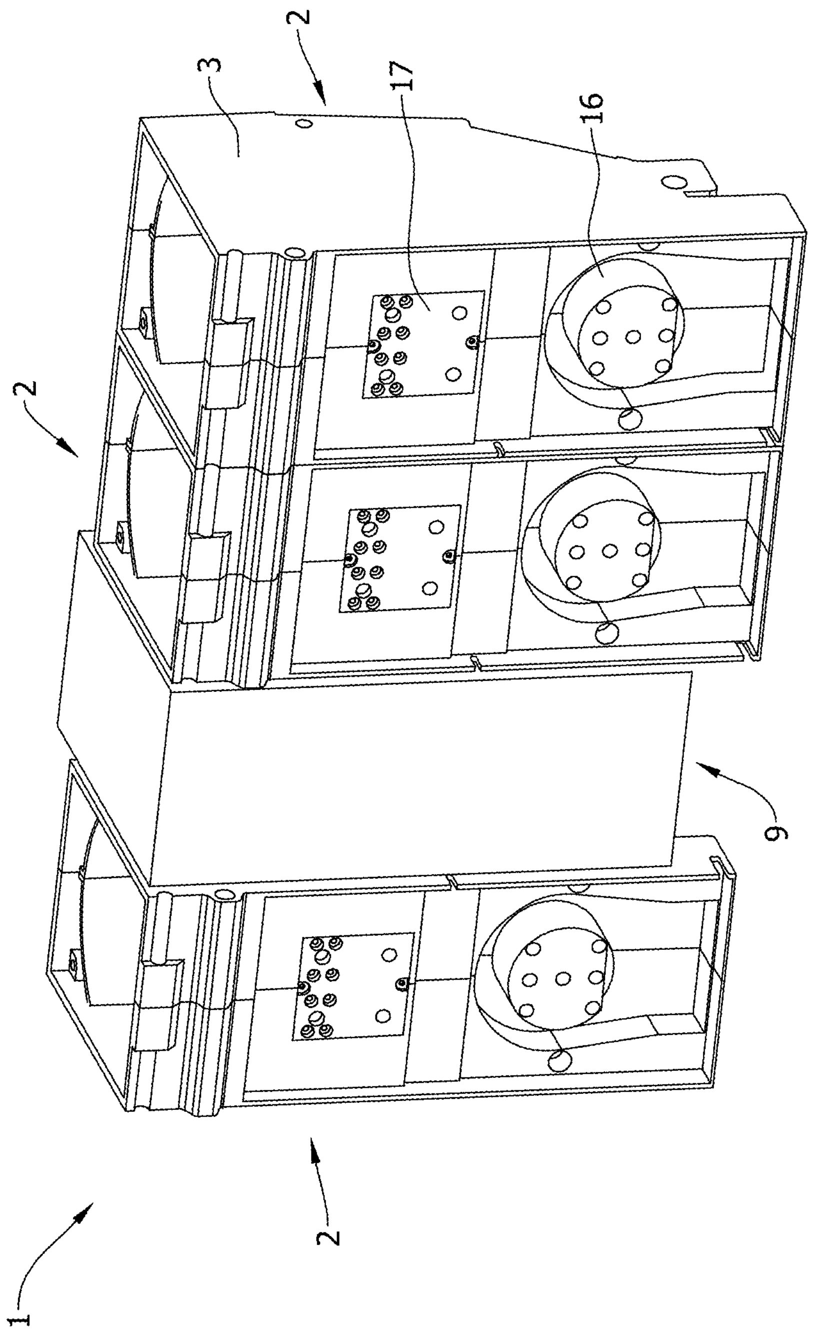
FIG. 22 schematically shows the switching apparatus of the present disclosure, according to another embodiment.

The switching apparatus 1 includes one or more electric poles 2, and may include two electric poles as shown in FIGS. 1-4 or three electric poles as shown in FIG. 22.

According to the present disclosure, each electric pole 2 includes an outer casing 3 made of an electrically insulating material (e.g. a thermoplastic material) and defining an internal volume, in which a number of components of said electric pole are accommodated.

The outer casing 3 conveniently extends along a corresponding main longitudinal axis 100 and it has an opposite first end portion 35 (normally the bottom end portion) and a second end portion 36 (normally the top end). The outer casing 3 may extend along the corresponding main longitudinal axis 100 with a parallelepiped-like shape.

Figure 1:
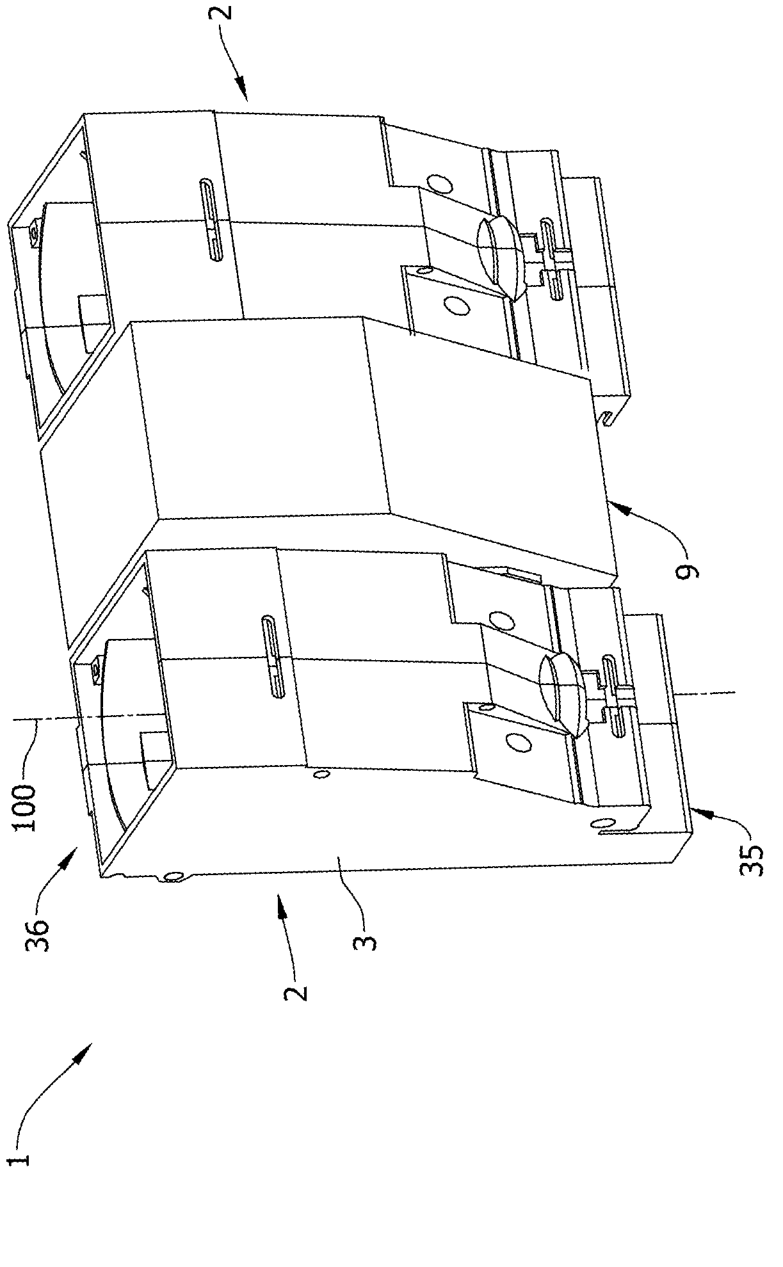
FIGS. 1-4 schematically show the switching apparatus of the present disclosure.
Figure 2:
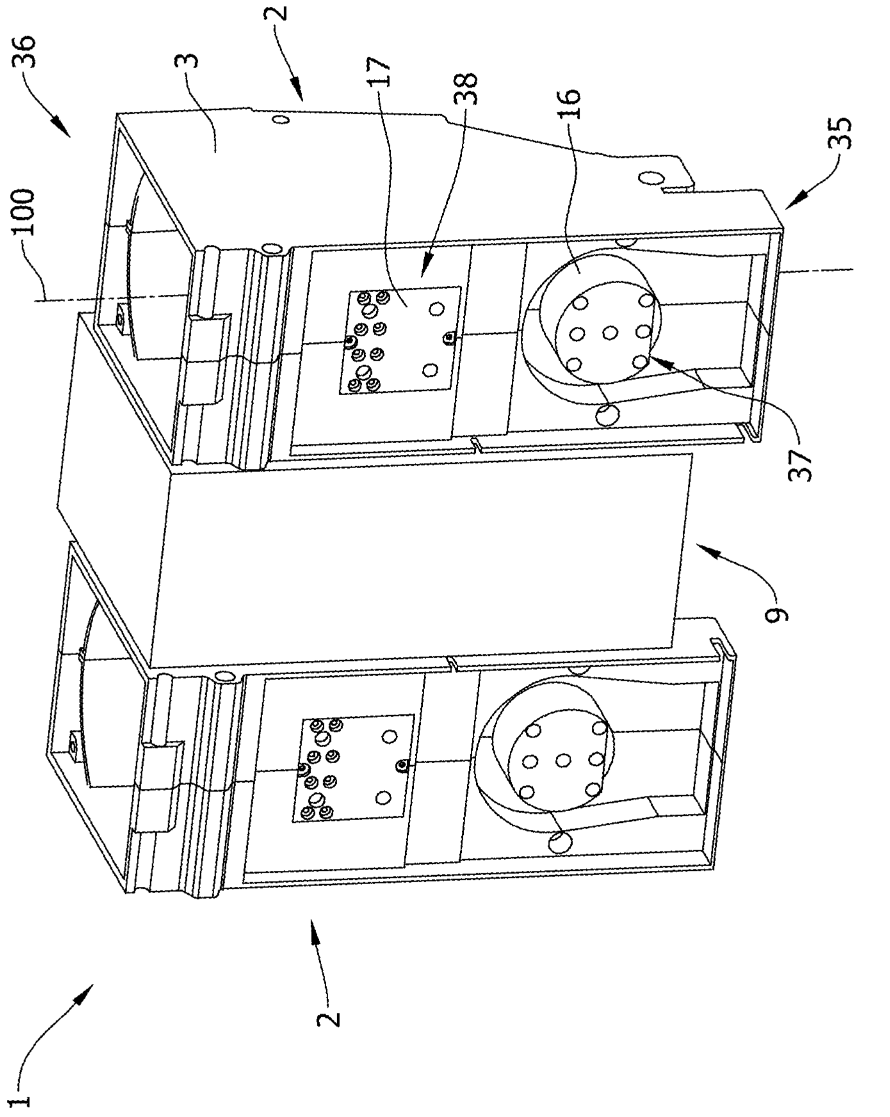
Figure 3:
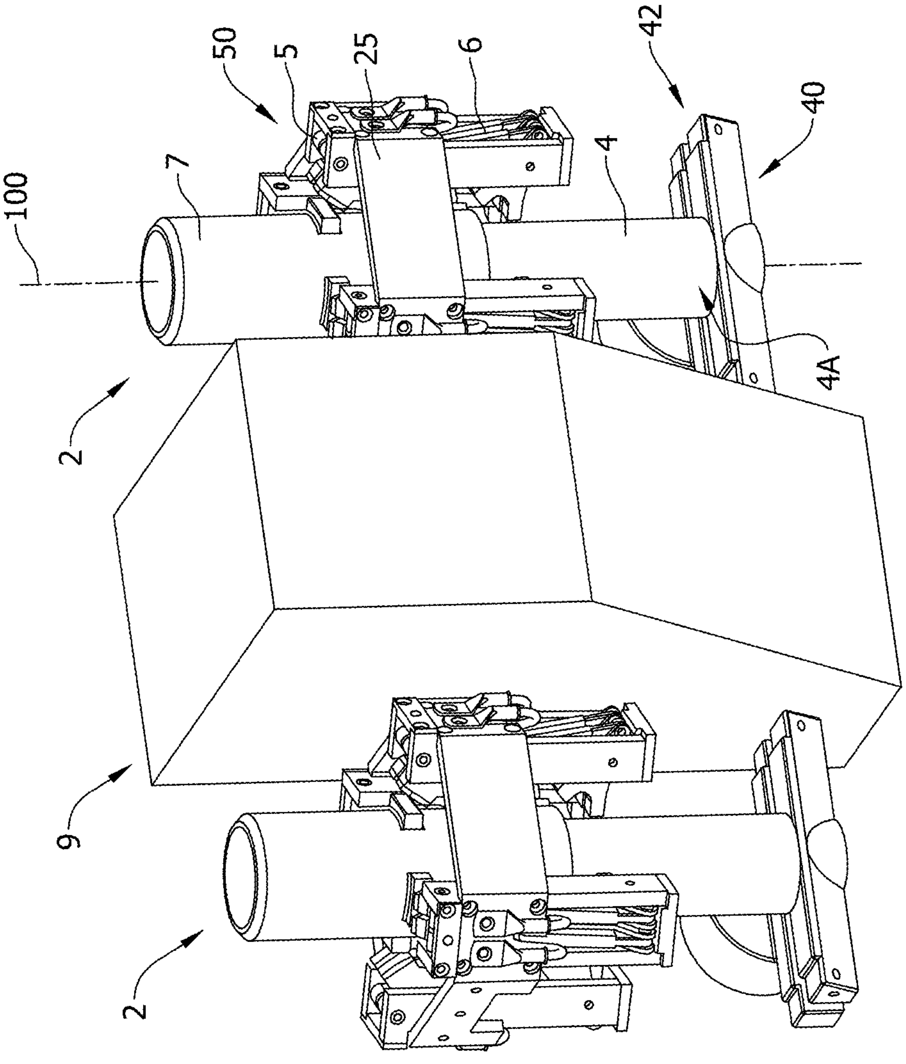
Figure 4:
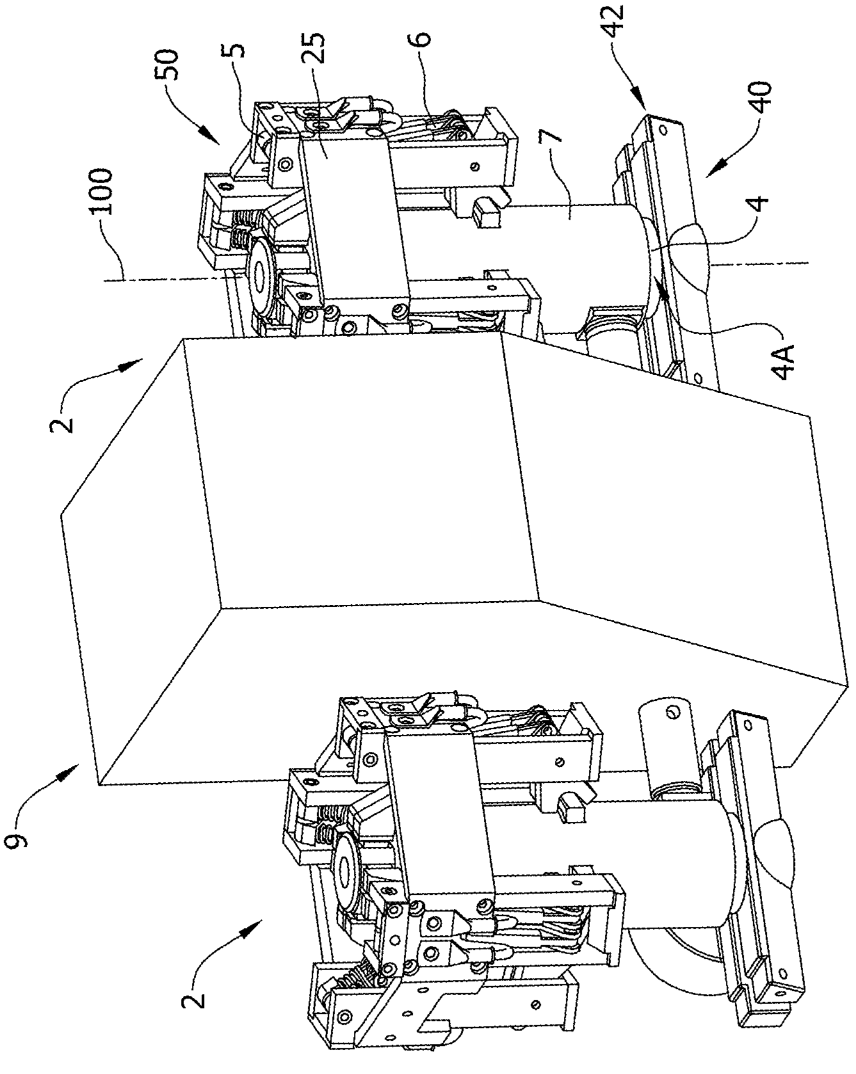
Figure 5:
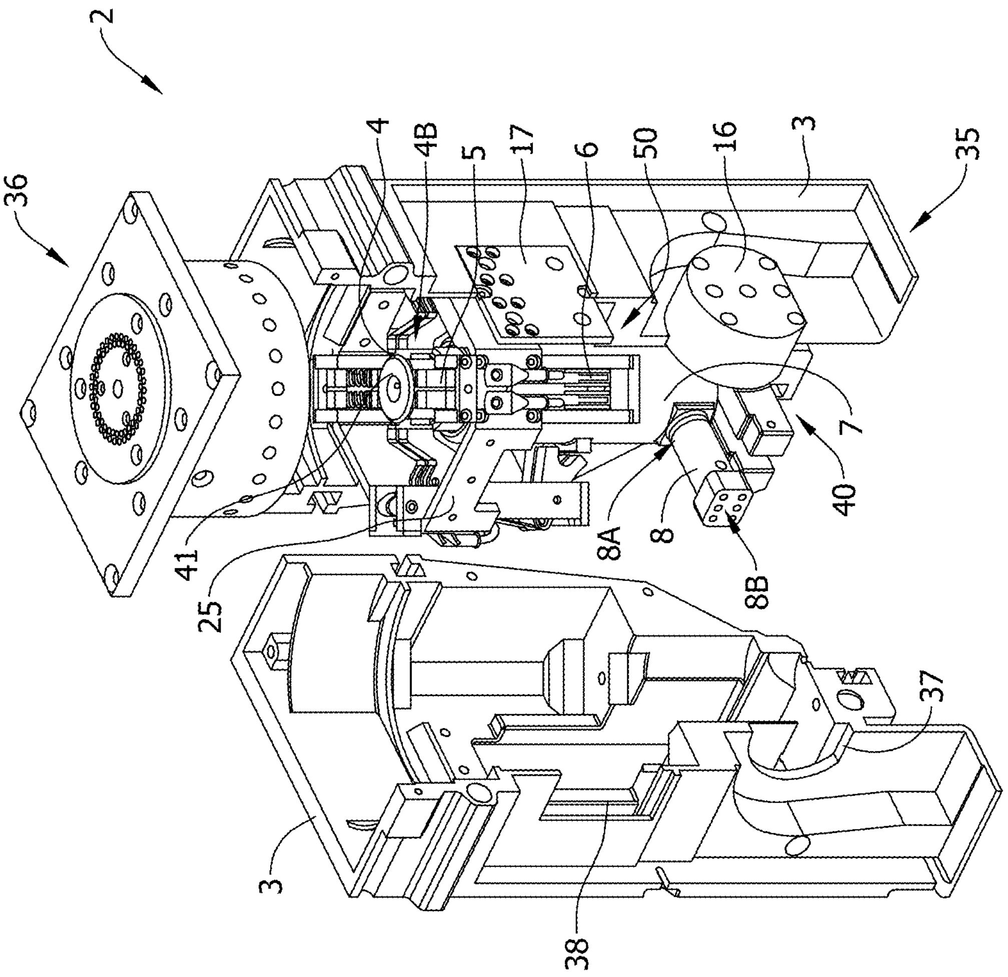
FIGS. 5-18 schematically show the structure and operation of an electric pole of the switching apparatus of the present disclosure according to a possible embodiment.

The outer casing 3 may be made of multiple shells or parts that can be mutually joined with fixing means of known type, as shown in FIG. 5.

The casing 3 of each electric pole may be fixed to a main support structure (not shown) of the switching apparatus 1 at its first end portion 35.

Each electric pole 2 includes a first pole terminal 16 and a second pole terminal 17.

The first and second pole terminals 16, 17 are electrically connectable with a first phase conductor and second phase conductor of an electric line, respectively.

The pole terminals 16, 17 may be formed by corresponding shaped conductive bodies or plates mechanically fixed to the outer casing 3 of the electric pole.

The first and second pole terminals 16, 17 may be positioned at a first opening 37 and a second opening 38 of the outer casing 3 respectively in a proximal position and a distal position relative to the lower end portion 35 of the outer casing.

According to the present disclosure, each electric pole 2 includes a fixed contact assembly 40 accommodated in the internal volume of said electric pole.

The fixed contact assembly 40 includes a fixed contact member 4, which is electrically connected to the first pole terminal 16.

The fixed contact member 4 is formed by an electrically conductive tubular element extending along the longitudinal axis 100 of the electric pole.

The fixed contact member 4 includes opposite first and second ends 4A, 4B. At the first end 4A, the fixed contact member 4 is fixed to the outer casing 3, in proximity of the first end portion 35 of this latter, and it is electrically connected to the first pole terminal 16. The second end 4B of the fixed contact member 4 is instead free-standing within the internal volume of the electric pole.

The fixed contact member 4 may be formed by a hollow tubular element of electrically conductive material (e.g. copper), which may have a cylindrical shape (as shown in the cited figures) or a polyhedric shape.

The fixed contact assembly 40 may include coupling means 41, 42 for fixing the fixed contact member 4 to the outer casing 3 and electrically connecting the fixed contact member 4 to the first pole terminal 16.

In the embodiments shown in the cited figures, the above-mentioned coupling means includes a first support element 41 of electrically insulating material. The first support element 41 is formed by a tubular element (and may include a longitudinal centring hole), which passes through the fixed contact member 4 along the longitudinal axis 100. To this aim, the first support element may have a cylindrical shape (as shown in the cited figures) or a polyhedric shape, in such a way to fit the fixed contact member 4.

At the first end 4A of the fixed contact member 4, the first support element 41 is fixed to one or more second support elements 42 of electrically conductive material, which are arranged transversally relative to the fixed contact member 4. The second support elements 42 are in turn fixed to the outer casing 3 of the electric pole and to the first pole terminal 16. In this way, they support the fixed contact member 4 and, at the same time, they electrically connect this latter to the first pole terminal 16.

According to the present disclosure, each electric pole 2 includes at least a movable contact assembly 50 accommodated in the internal volume and hanging laterally relative to said fixed contact member 4. The movable contact assembly 50 may hang along a circumference or polygon centred with the longitudinal axis 100 and laying along a plane perpendicular to this latter.

Each electric pole 2 may include a plurality (which may include one or more pairs) of movable contact assemblies 50 equally spaced around the fixed contact member 4.

In the cited figures, there are shown embodiments of the present disclosure, in which each electric pole 2 includes two pairs of movable contact assemblies 50 equally spaced around the fixed contact member 4. Each pair of movable contact assemblies 50 is conveniently arranged at opposite sides of the fixed contact member 4.

However, different arrangements of the movable contact assemblies are possible, according to the needs. For example, each electric pole 2 may include two or three movable contact assemblies 50 equally spaced around the fixed contact member 4. Furthermore, in principle, each electric pole 2 may include even a single movable contact assembly 50.

According to the present disclosure, each movable contact assembly 50 includes one or more movable contact members 5, which are electrically connected to the second pole terminal 17.

According to some embodiments of the present disclosure (FIGS. 1-18), each movable contact assembly 50 includes a pair of movable contact members 5 movable in parallel around a same first rotation axis R1.

According to other embodiments of the present disclosure (FIGS. 19-21), each movable contact assembly 50 includes a single movable contact member 5 movable around a corresponding first rotation axis R1.

Each movable contact member 5 is movable about a first rotation axis R1 and includes a contact surface 5A intended to be coupled with or decoupled from a corresponding contact surface 4C of the fixed contact member.

In particular, each movable contact member 5 is reversibly movable, about a first rotation axis R1, between a coupled position P1 (FIGS. 6-10, 19-20), at which the contact surface 5A of said movable contact member 5 is coupled with a corresponding contact surface 4C of the fixed contact member 4, and an uncoupled position P2 (FIGS. 12-13, 21), at which the contact surface 5A of the movable contact member 5 is separated from the corresponding contact surface 4A of the fixed contact member 4.

When the movable contact members 5 of each electric pole 2 are in a coupled position P1, an electric current can flow along said electric pole between the pole terminals 16, 17. The switching apparatus is in a closed condition.

When the movable contact members 5 of each electric pole 2 are in an uncoupled position P2, no electric current can flow along said electric pole. The switching apparatus is in an open condition.

A transition from a closed condition to an open condition forms an opening maneuver of the switching apparatus whereas a transition from an open condition to a closed condition forms a closing maneuver of the switching apparatus.

According to the present disclosure, each movable contact assembly 50 includes at least one trip mechanism 6 coupled to the one or more movable contact members 5 of said movable contact assembly for actuating said one or more movable contact members.

In the cited figures, there are shown embodiments of the present disclosure, in which each movable contact assembly 50 includes a trip mechanism 6 for each movable contact member 5. However, different arrangements of the movable contact assemblies are possible, according to the needs. For example, each movable contact assembly 50 may include a single trip mechanism 6 for actuating a pair of movable contact members 5 in parallel.

Each trip mechanism 6 is adapted to actuate at least a corresponding movable contact member 5 between the above-mentioned coupled and uncoupled positions P1, P2.

To this aim, each trip mechanism 6 is reversibly movable between a first trip position P3 and a second trip position P4.

When it moves from the first trip position P3 to the second trip position P4 upon receiving an actuation force, each trip mechanism 6 moves a corresponding movable contact member 5 from the coupled position P1 to the uncoupled position P2 (FIGS. 6-10, 19-20).

Figure 12:
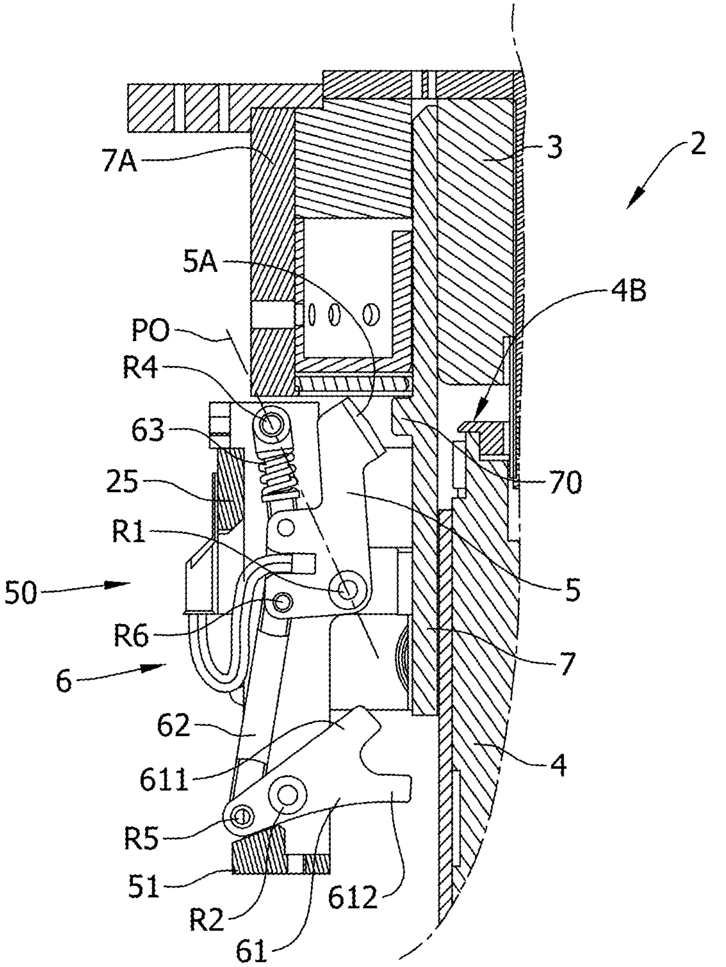
Figure 13:
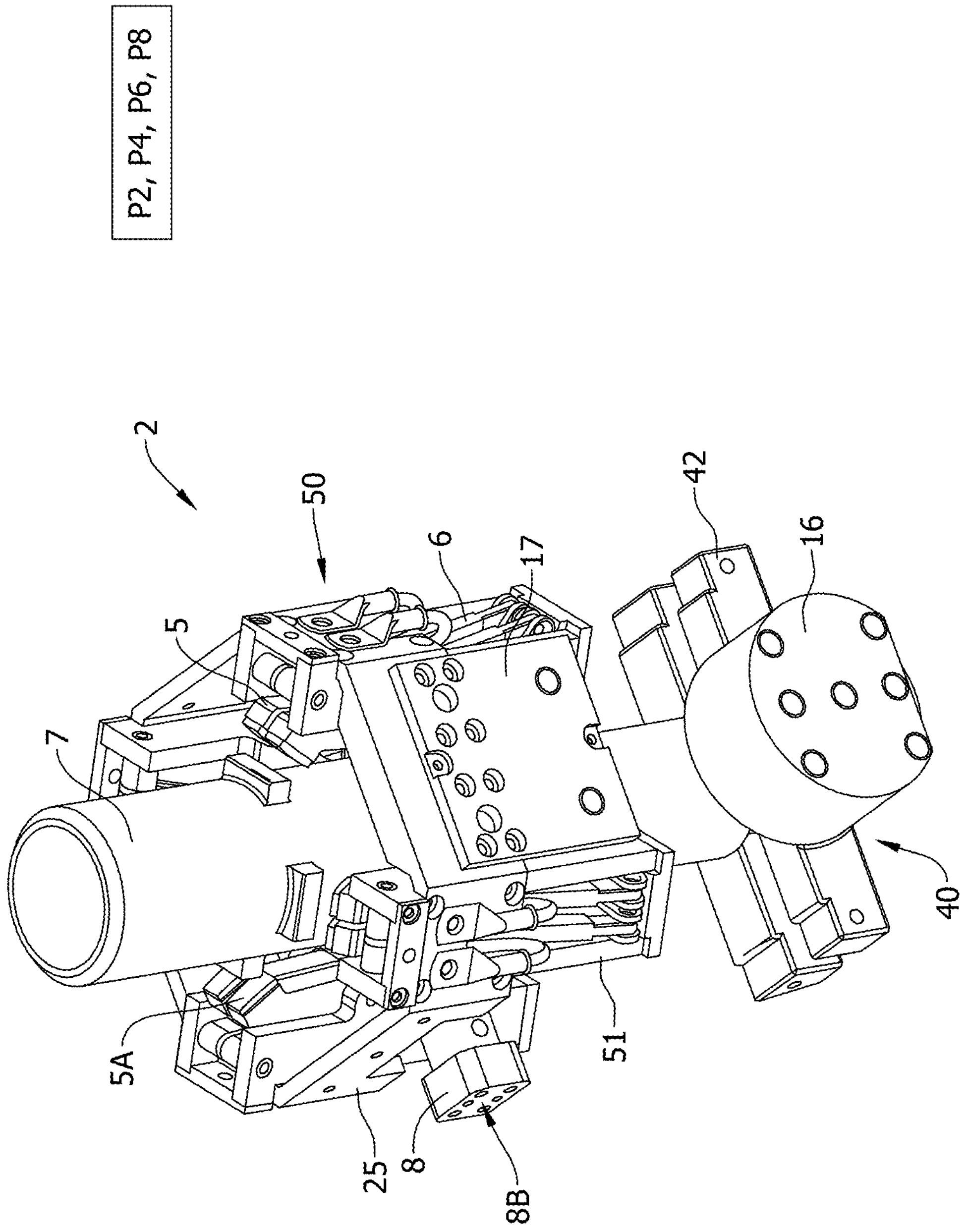
Figure 21:
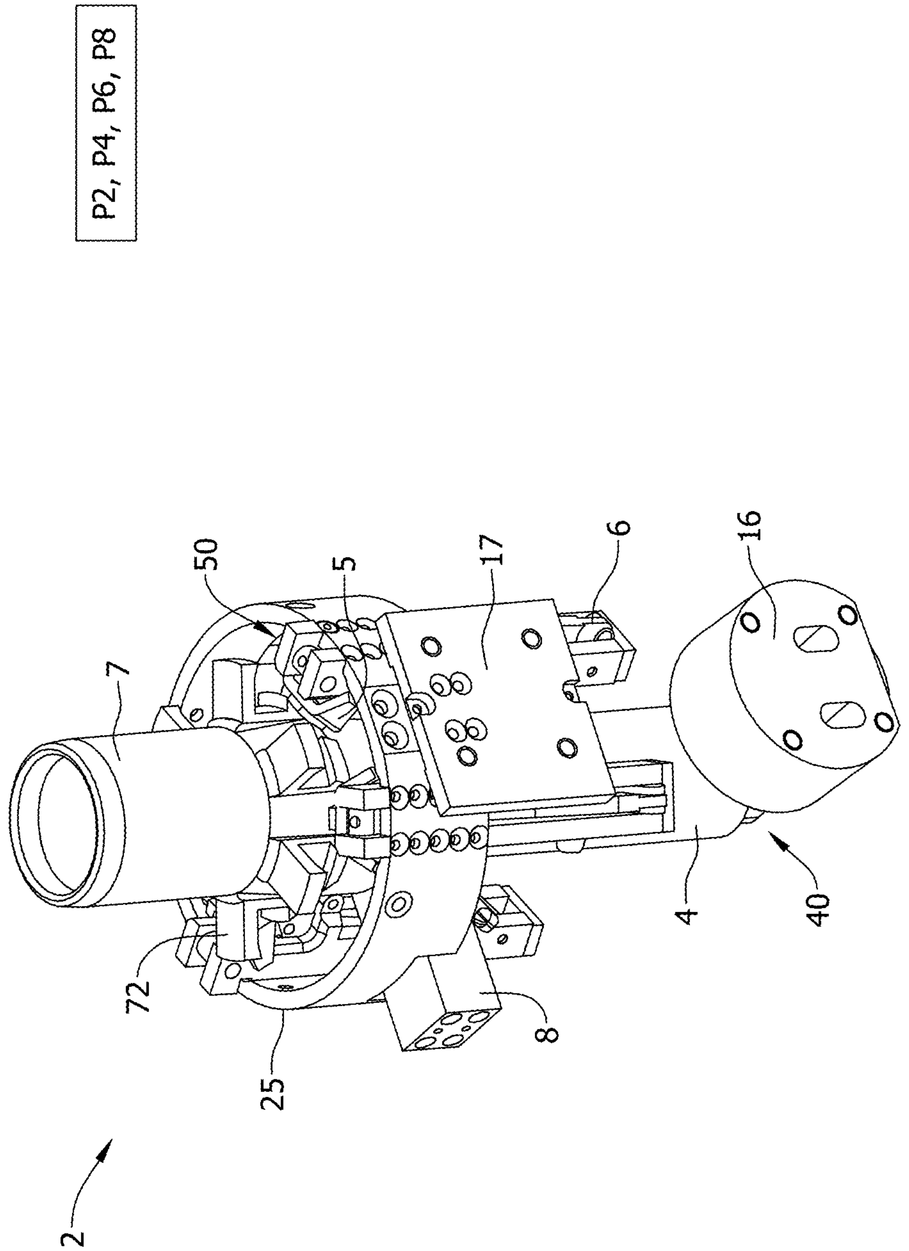

When it moves from the second trip position P4 to the first trip position P3 upon receiving an actuation force, each trip mechanism 6 moves a corresponding movable contact member 5 from the uncoupled position P2 to the coupled position P1 (FIGS. 12-13, 21).

Each movable contact assembly 50 may include a supporting frame 51 to hold in position each movable contact member 5 and each trip mechanism 6 of said movable contact assembly.

Each supporting frame 51 may be arranged (for example as a U-shaped frame) in such a way to hold the one or more movable contact members 5 and trip mechanisms 6 in their operating positions and, at the same time, allow the above-described movements of these components.

According to an aspect of the present disclosure, each electric pole 2 includes an internal supporting structure 25 for holding the movable contact assemblies 50 in such a way that these latter are hung laterally relative to the fixed contact member 4, around this latter.

Figure 7:
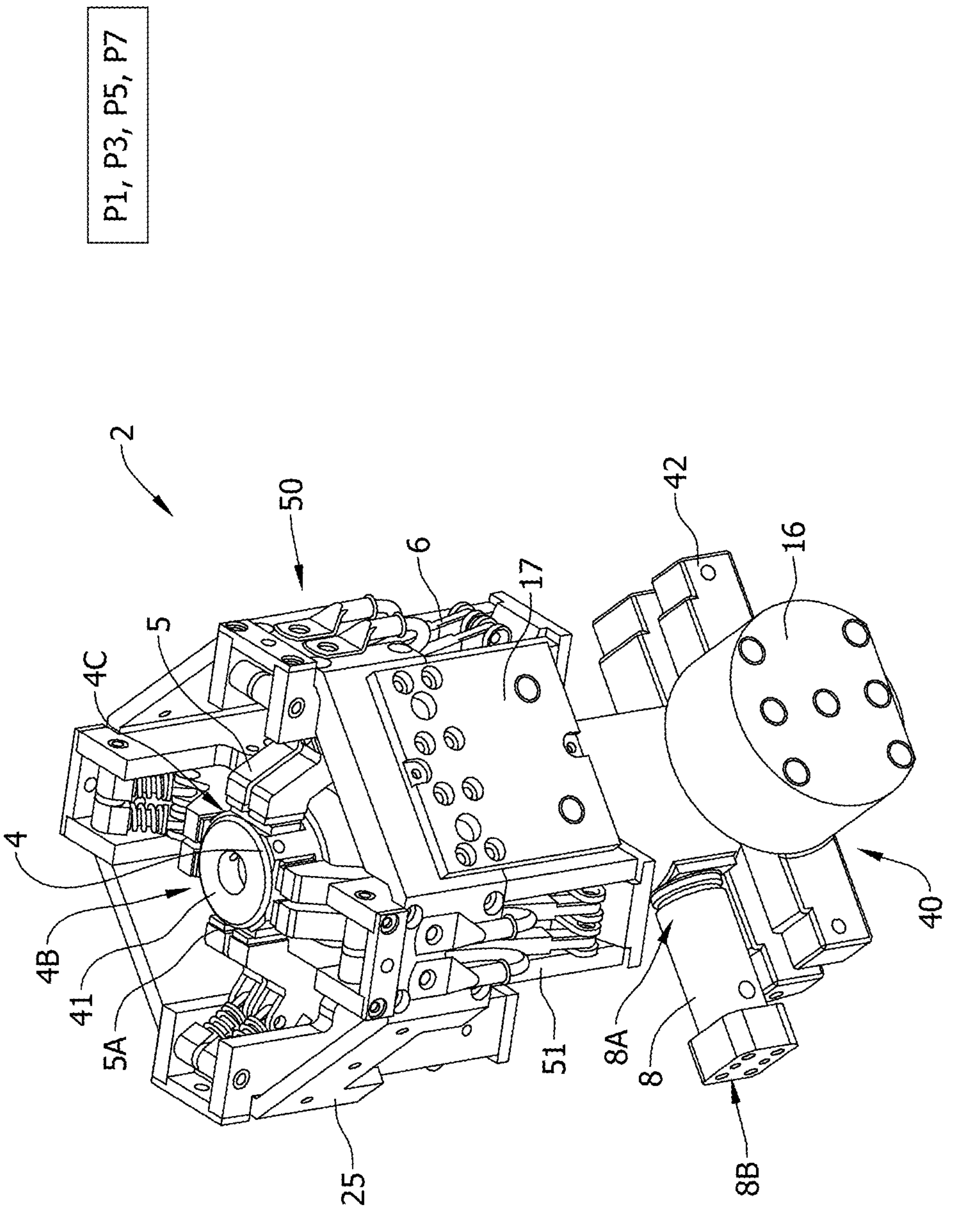
Figure 8:
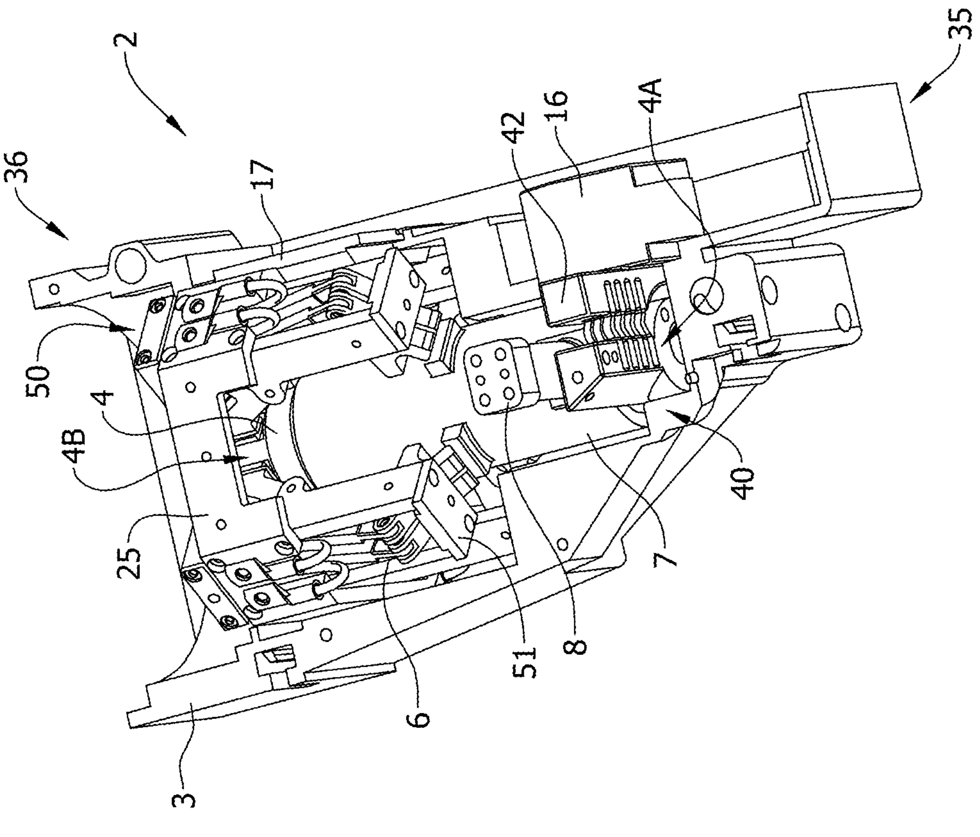
Figure 9:
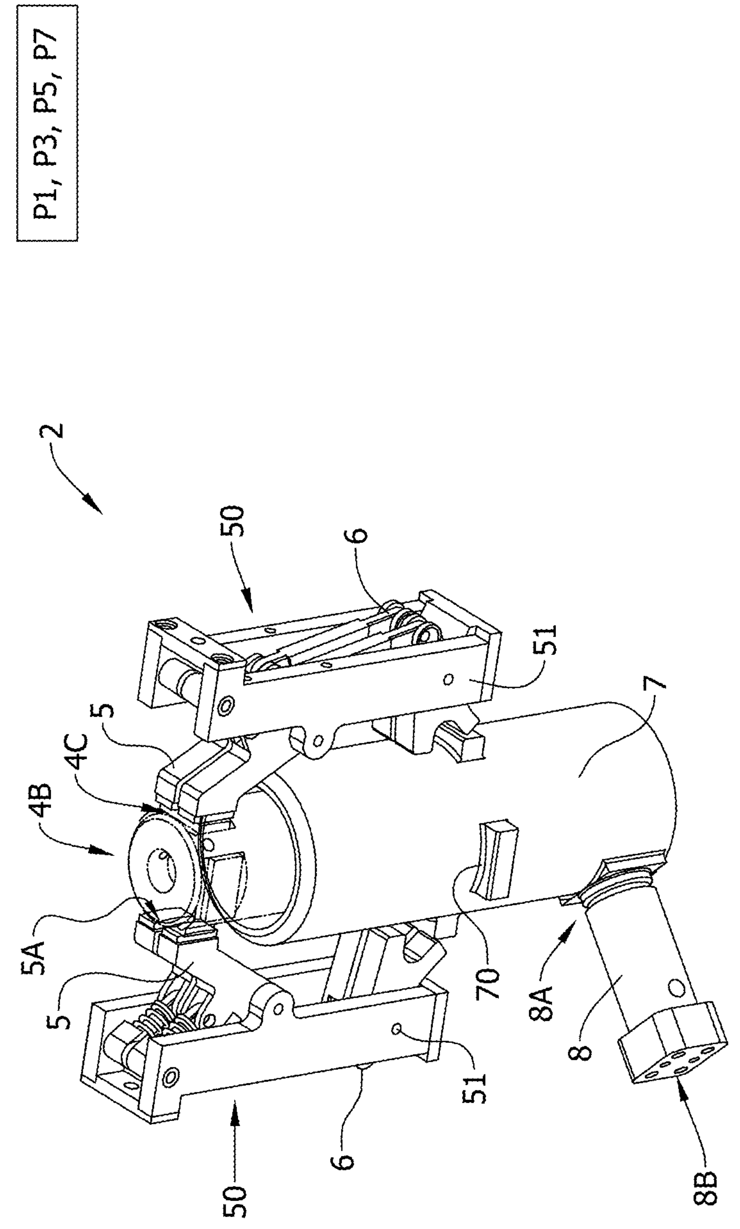
Figure 10:
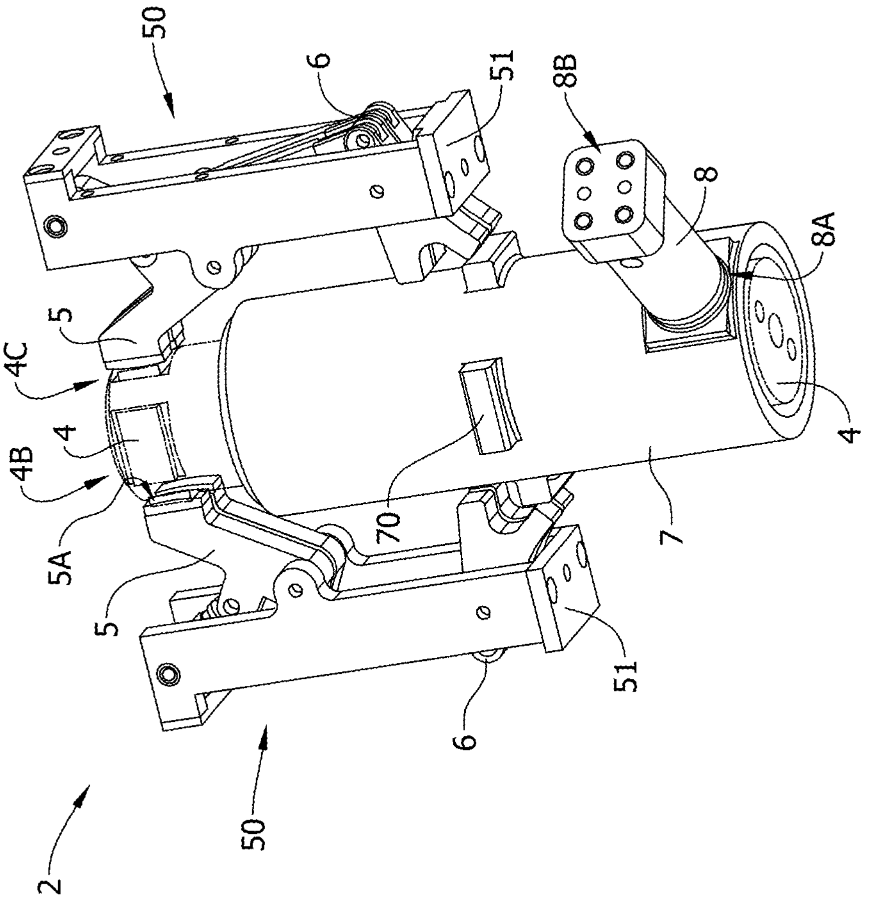

The supporting structure 25 is made of an electrically conductive material and is electrically connected to each movable contact member 5 and to the second pole terminal 17 through suitable electrical connections (partially shown in FIGS. 7-8, 13).

The supporting frame 51 of each movable contact assembly 50 is fixed to a suitable corresponding portion of the supporting frame 25.

When its supporting frame 51 is fixed to the supporting frame 25, each movable contact member 5 is conveniently oriented along a corresponding reference plane (not shown) belonging to a bundle of planes intersecting at the longitudinal axis 100.

The supporting structure 25 is fixed to the outer casing 3 though suitable fixing means (not shown), which may be of known type. In this way, the one or more movable contact assemblies 50 are rigidly fixed to the contact frame.

According to the present disclosure, each electric pole 2 includes an actuation member 7 accommodated in the internal volume of said electric pole.

The actuation member 7 is formed by an electrically insulating hollow tubular element arranged coaxially and externally relative to the fixed contact member 4, so that the fixed contact member 4 passes through the actuation member 7, along the longitudinal axis 100.

Conveniently, the actuation member 7 may have a cylindrical shape (as shown in the cited figures) or a polyhedric shape, in such a way to fit the fixed contact member 4.

The actuation member 7 is coupled to the fixed contact member 4, so that it can slidingly move along the fixed contact member 4.

The actuation member 7 is adapted to transmit an actuation force to each trip mechanism 6 of the movable contact assemblies 50.

To this aim, the actuation member is reversibly movable between a first actuation position P5 and a second actuation position P6 by sliding along the fixed contact member 4.

When it moves between the above-mentioned first and second actuation positions P5, P6, the actuation member 7 transiently couples (i.e. it does not couple in a permanent or stable manner) to each trip mechanism 6 to actuate said trip mechanism between the above-mentioned first and second trip positions P3, P4.

Figure 6:
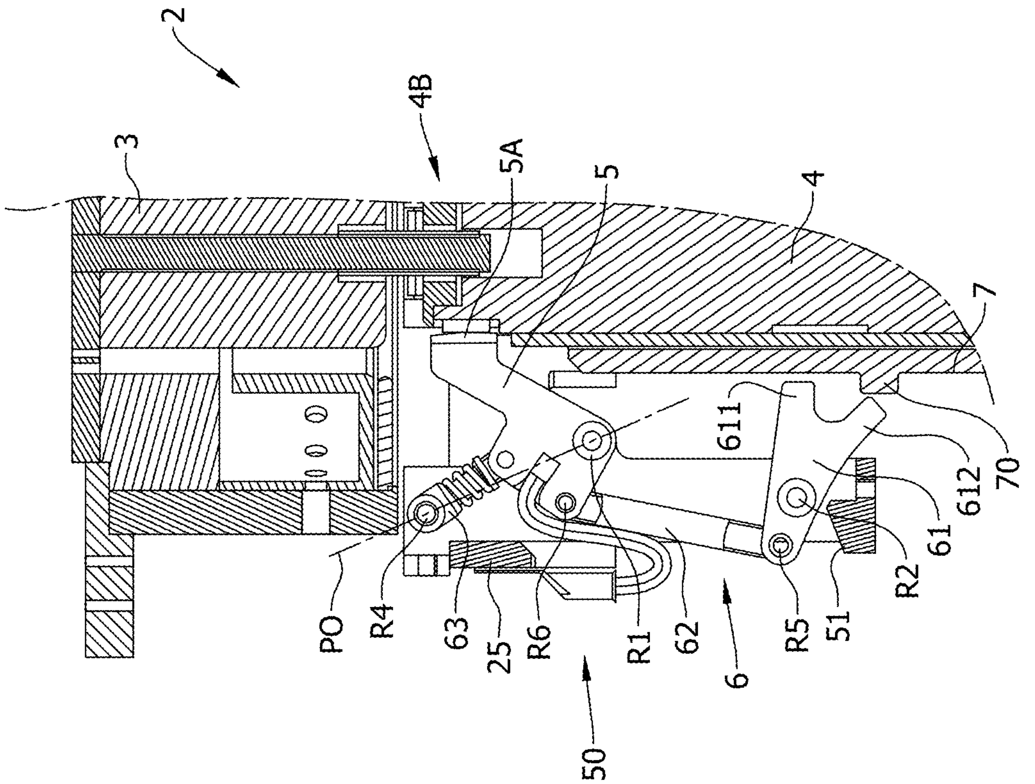
Figure 17:
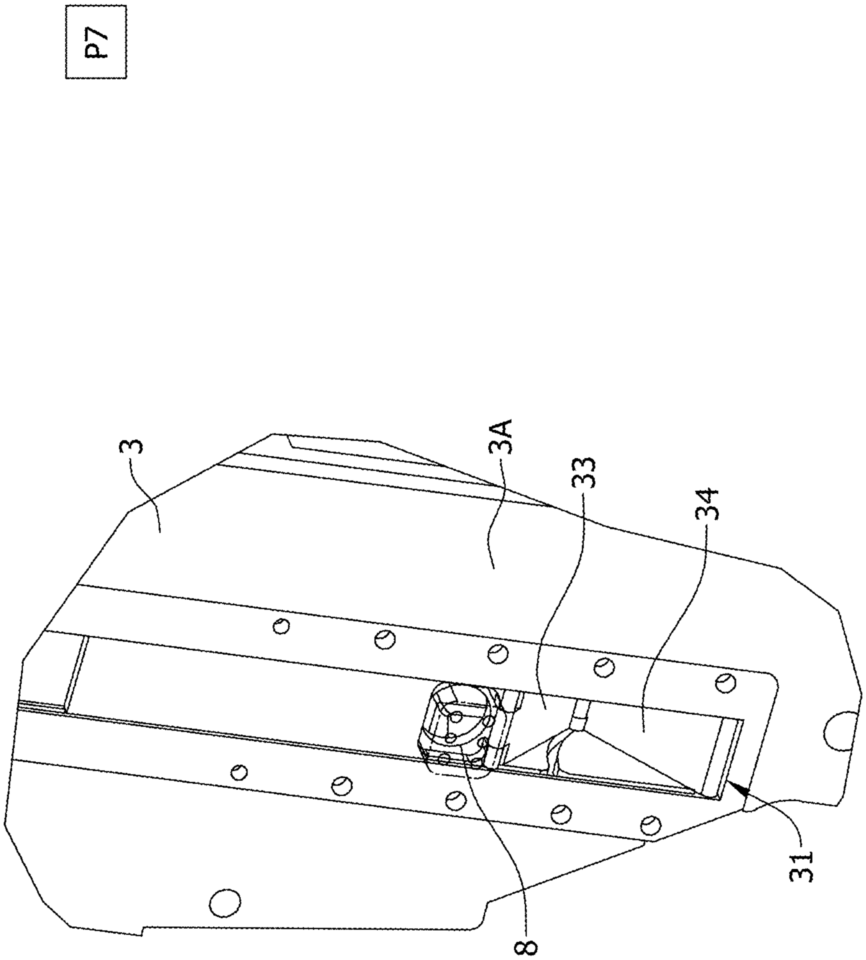
Figure 18:
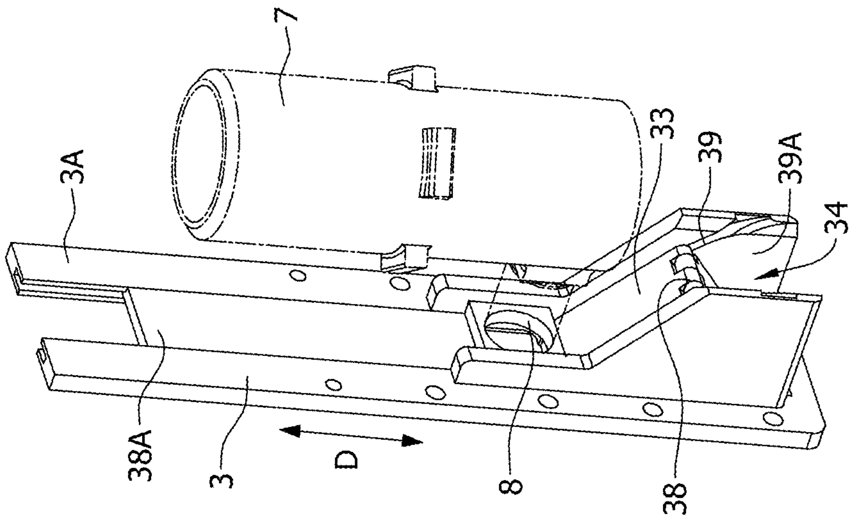

When it moves from the first actuation position P5 to the second actuation position P6, the actuation member 7 transiently couples to each trip mechanism 6 and provides an actuation force to move said trip mechanism 6 from the first trip position P3 to the second trip position P4 (FIGS. 6, 7, 17).

Figure 19:
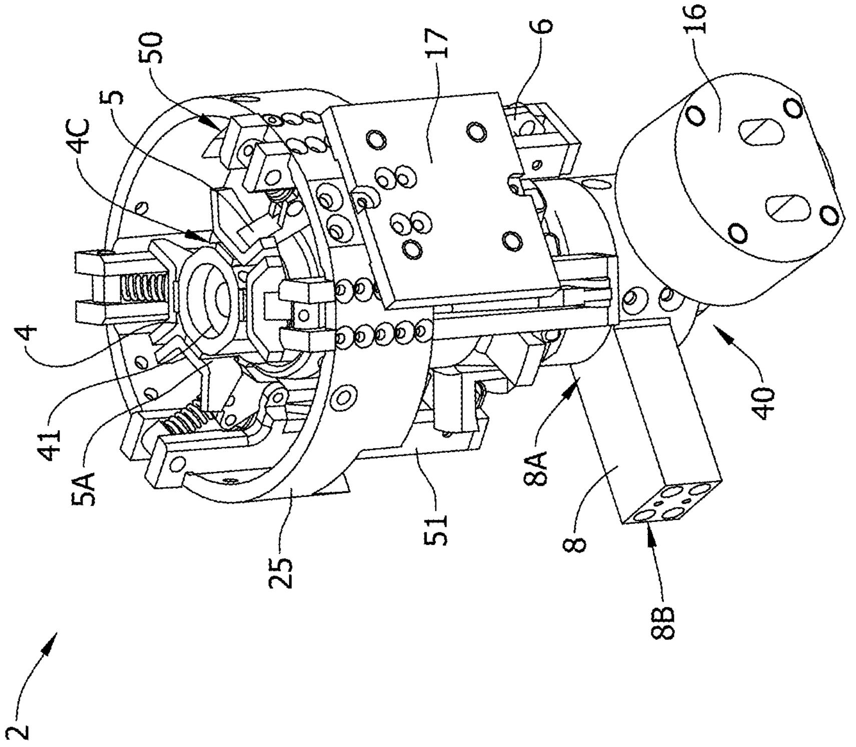
FIGS. 19-21 schematically show the structure and operation of an electric pole of the switching apparatus of the present disclosure, according to another embodiment.
Figure 20:
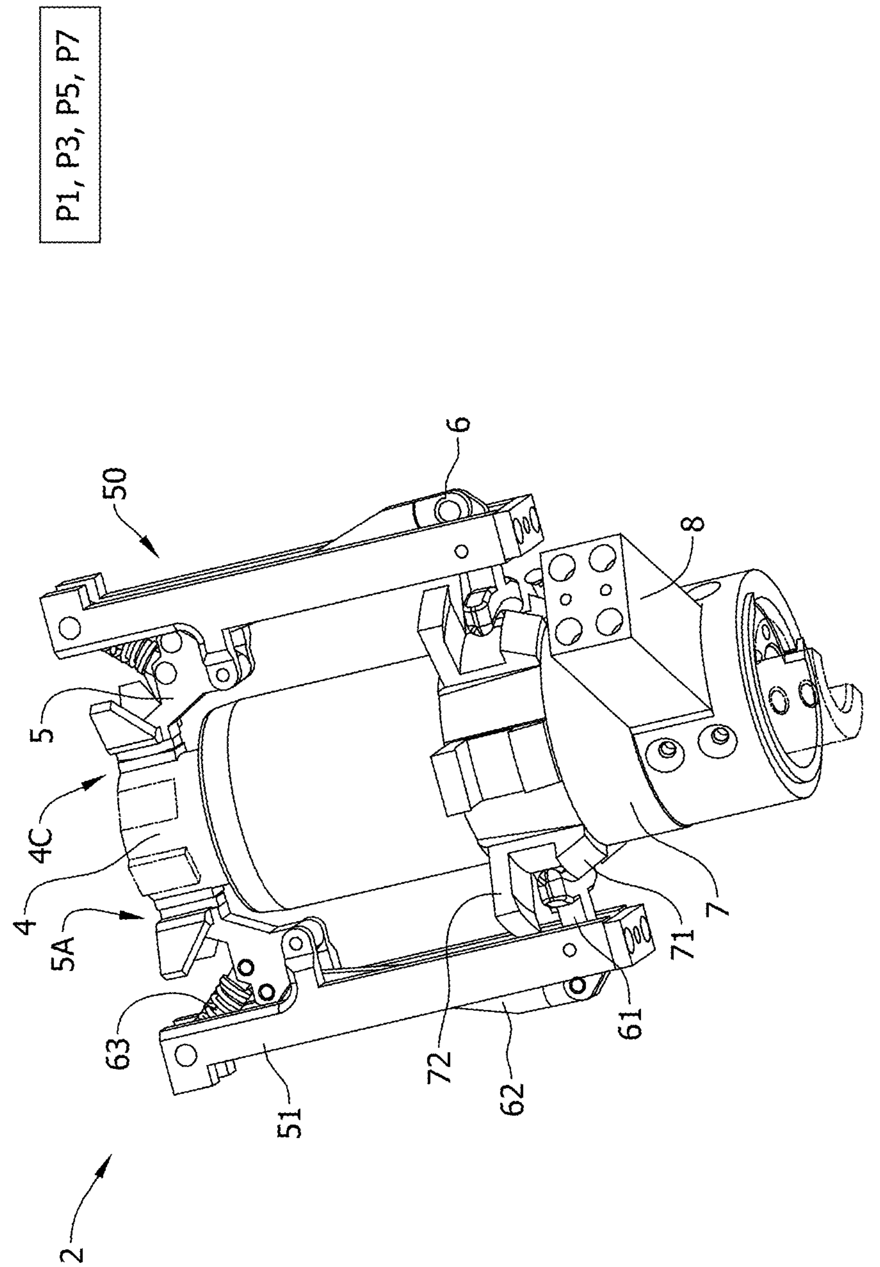

When it moves from the second actuation position P6 to the first actuation position P5, the actuation member 7 transiently couples to each trip mechanism 6 and provides an actuation force to move said trip mechanism 6 from the second trip position P2 to the first trip position P3 (FIGS. 12, 13, 19).

According to a particularly important aspect of the present disclosure, an insulating portion 70 of the actuation member 7 is interposed between the contact surface 5A of each movable contact member 5 and the corresponding contact surface 4A of the fixed contact member 4, when the actuation member 7 is in the second actuation position P6 (FIGS. 12, 13, 19).

Each electric pole 2 may include a motion transmission member 8 solidly coupled to the actuation member 7. The motion transmission member 8 may be coupled to the actuation member 7 in such a way to form a single piece with the actuation member 7.

The motion transmission member 8 may be formed by an electrically insulating tubular element (which may have a cylindrical shape or a polyhedric shape and it may be optionally provided with one or more longitudinal holes) oriented along a transversal direction perpendicular to the longitudinal axis 100 of the electric pole.

The motion transmission member 8 may be coupled, at a first end 8A, to the actuation member 7, conveniently in a proximal position relative to the first end 4A of the fixed contact member 4.

The transmission member 8 may protrude from the outer casing 3. Further, the transmission member 8 may protrude from the outer casing 3 at a second end 8B, opposite to the first end 8A.

Conveniently, the motion transmission member 8 passes through a slot 31 arranged at a lateral wall 3A of the outer casing 3 and oriented along a direction parallel to the longitudinal axis 100.

The motion transmission member 8 is adapted to transmit an actuation force to the actuation member 7, so that this latter can slide along the fixed contact member 4 between the above-mentioned actuation positions P5, P6.

Being rigidly coupled to the actuation member 7, the motion transmission member 8 moves along a motion direction D parallel to the longitudinal axis 100, thereby sliding along the slot 31 of the outer casing 3.

According to an aspect of the present disclosure, the switching apparatus 1 includes actuation means 9 for actuating the actuation member 7 of each electric pole 2. In this way, the actuation members 7, the operating mechanisms 6 and movable contact members of all the electric poles operate simultaneously according to the needs.

The actuation means 9 may be coupled to the motion transmission member 8 of each electric pole 2, in particular to the second end 8B of this latter. In this way, the actuation means 9 can actuate the actuation member 7 of each electric pole through the corresponding motion transmission member 8.

In general, the actuation means 9 are of mechanical type or electromagnetic type.

According to some embodiments of the present disclosure (FIGS. 1-4), the actuation means 9 are according to a side-by-side configuration with the electric poles 2. In these cases, the switching apparatus 1 may include two electric poles 2 only.

In general, however, the switching apparatus 1 may include even three or more electric poles 2 as shown in FIG. 22. In these cases, the actuation member 7 of each electric pole, which is in a relatively distal position with respect to the actuation means 9, is conveniently actuated by a relatively complex motion transmission chain including a motion transmission member 8.

Figure 23:
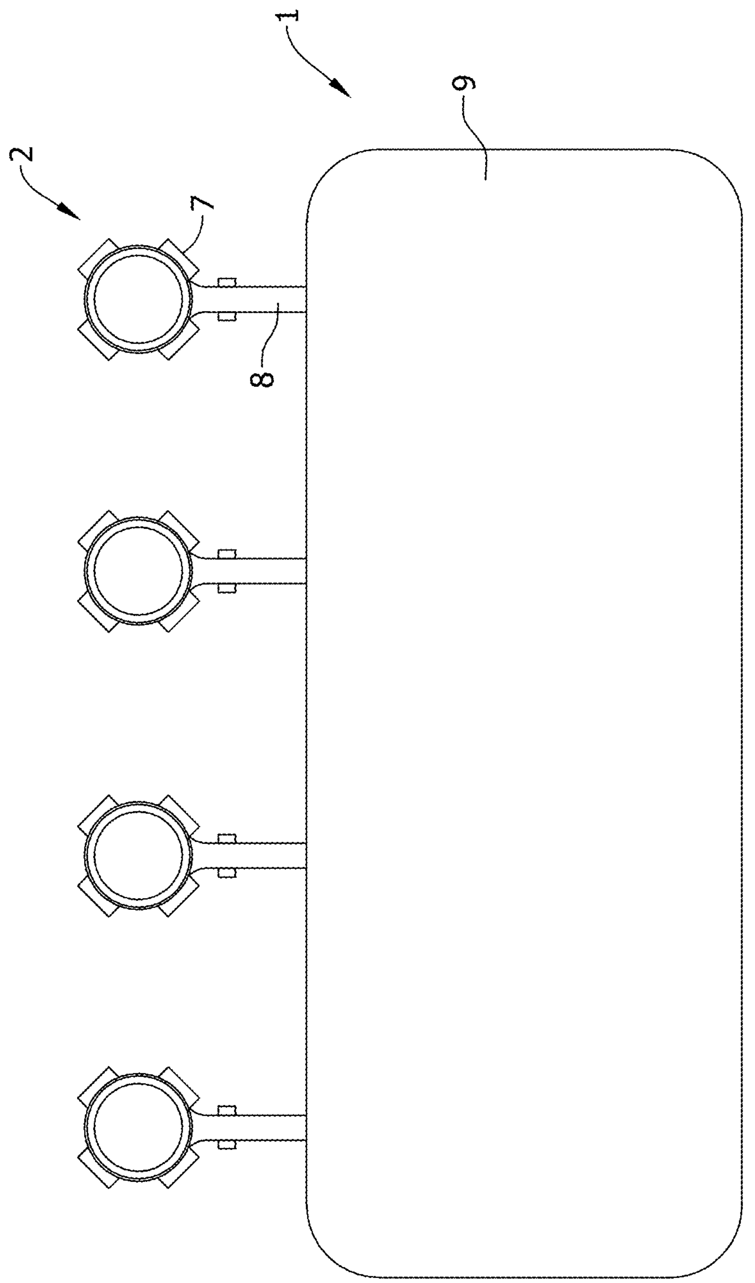
FIG. 23 schematically shows the switching apparatus of the present disclosure, according to yet another embodiment.

According to other embodiments of the present disclosure (FIG. 23), the actuation means 9 are arranged at the front side or the rear side of the switching apparatus. In these cases, the switching apparatus 1 may conveniently include even a relatively high number of electric poles (e.g. three or four).

According to an aspect of the present disclosure, each trip mechanism 6 includes a kinematic chain for transmitting an actuation force to a corresponding movable contact member 5, upon actuation by the actuation member 7.

Such a kinematic chain conveniently includes a first lever 61 reversibly movable about a second rotation axis R2 (parallel to the first rotation axis of the movable contact member 5), in particular between a first rotation position P7 (FIGS. 6-11, 19-20) and a second rotation position P8 (FIGS. 12-14, 21).

The first lever 61 is conveniently arranged in such a way to be actuated by the actuation member 7, when this latter moves between the first and second actuation positions P5, P6.

When it moves from the first actuation position P5 to the second actuation position P6, the actuation member 7 transiently couples to the first lever 61 and actuates this latter to move it from the first rotation position P7 to the second rotation position P8.

When it moves from the second actuation position P6 to the first actuation position P5, the actuation member 7 transiently couples to the first lever 61 and actuates this latter to move it from the second rotation position P8 to the first rotation position P1.

The above-mentioned kinematic chain includes a second lever 62 coupled to the first lever 61 and to the movable contact member 5. The second lever 62 is conveniently arranged in such a way to transmit an actuation force to the movable contact member 5 to move this latter between the coupled and uncoupled positions P1, P2, when the first lever 61 is actuated by the actuation member 7.

In particular, the second lever 62 is coupled to the first lever 61 (about a rotation axis R5 parallel to the rotation axes R1, R2) in such a way to form a first crack-slider mechanism transforming a rotation movement of the first lever 61 in a translation movement of the second lever 62.

Similarly, the second lever 62 is coupled to the movable contact member 5 (about another rotation axis R6 parallel to the rotation axes R1, R2) in such a way to form a second crack-slider mechanism transforming a translation movement of the second lever 62 in a rotation movement of the movable contact member 5.

When the first lever 61 moves from the first rotation position P7 to the second rotation position P8, the second lever 62 transmits an actuation force to the movable contact member 5 to move this latter from the coupled position P1 to the uncoupled position P2, When the first lever 61 moves from the second rotation position P8 to the first rotation position P1, the second lever 62 transmits an actuation force to the movable contact member 5 to move this latter from the uncoupled position P2 to the coupled position P1.

According to an aspect of the present disclosure, each trip mechanism 6 includes tripping means 63 for providing an actuation force to move a corresponding movable contact member 5 towards the coupled position P1 or towards the uncoupled position P2, when the movable contact member 5 moves past a deadlock position P0, while travelling between the coupled and uncoupled positions P1, P2.

While the movable contact member 5 is travelling from the coupled position P1 towards the uncoupled position P2 upon the actuation force provided by the kinematic chain 61-62, the tripping means 63 provides an actuation force to trip the movable contact member 5 to the uncoupled position P2, as soon as the movable contact member 5 moves past a certain deadlock position P0.

While the movable contact member 5 is travelling from the uncoupled position P2 towards the coupled position P1 upon the actuation force provided by the kinematic chain 61-62, the tripping means 63 provides an actuation force to trip the movable contact member 5 to the coupled position P1, as soon as the movable contact member 5 moves past the deadlock position P0.

Figure 11:
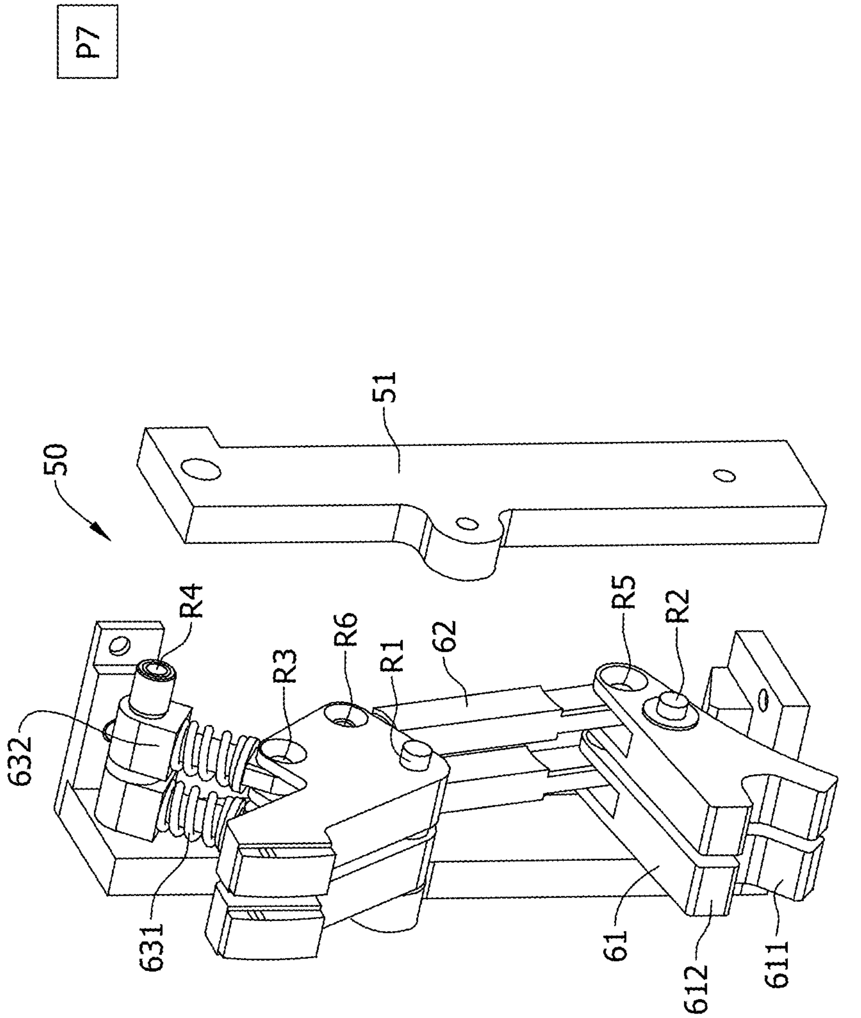
Figure 14:
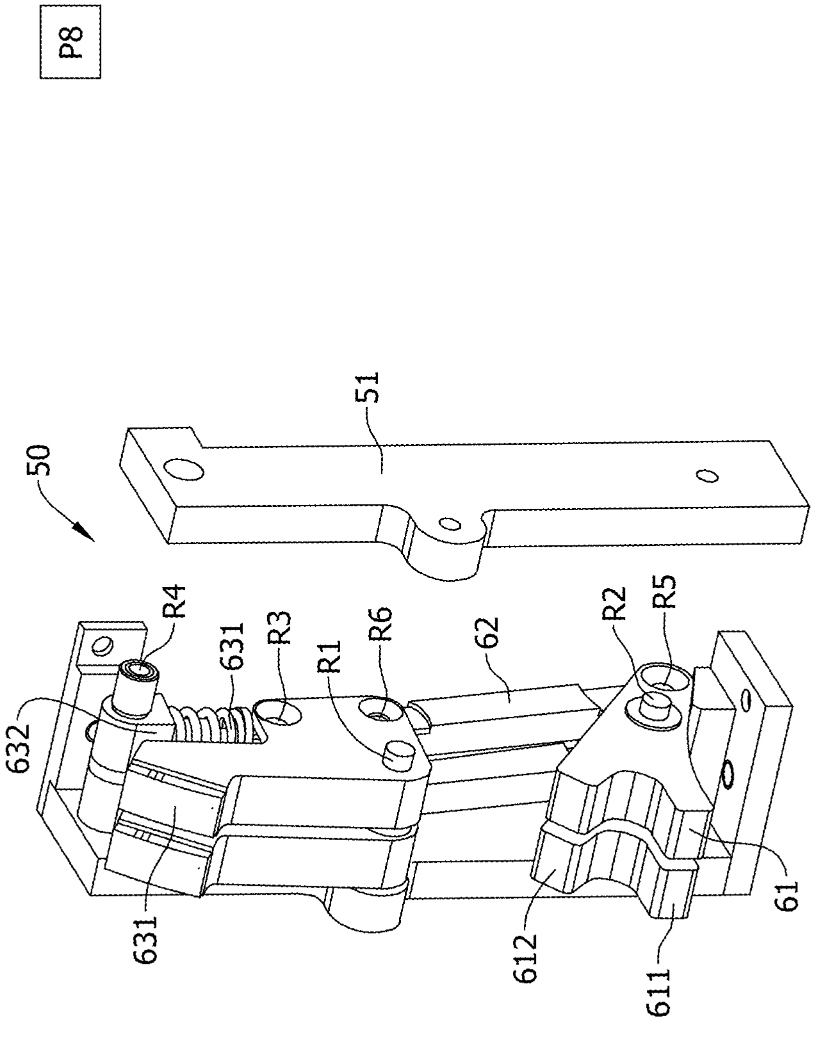
Figure 15:
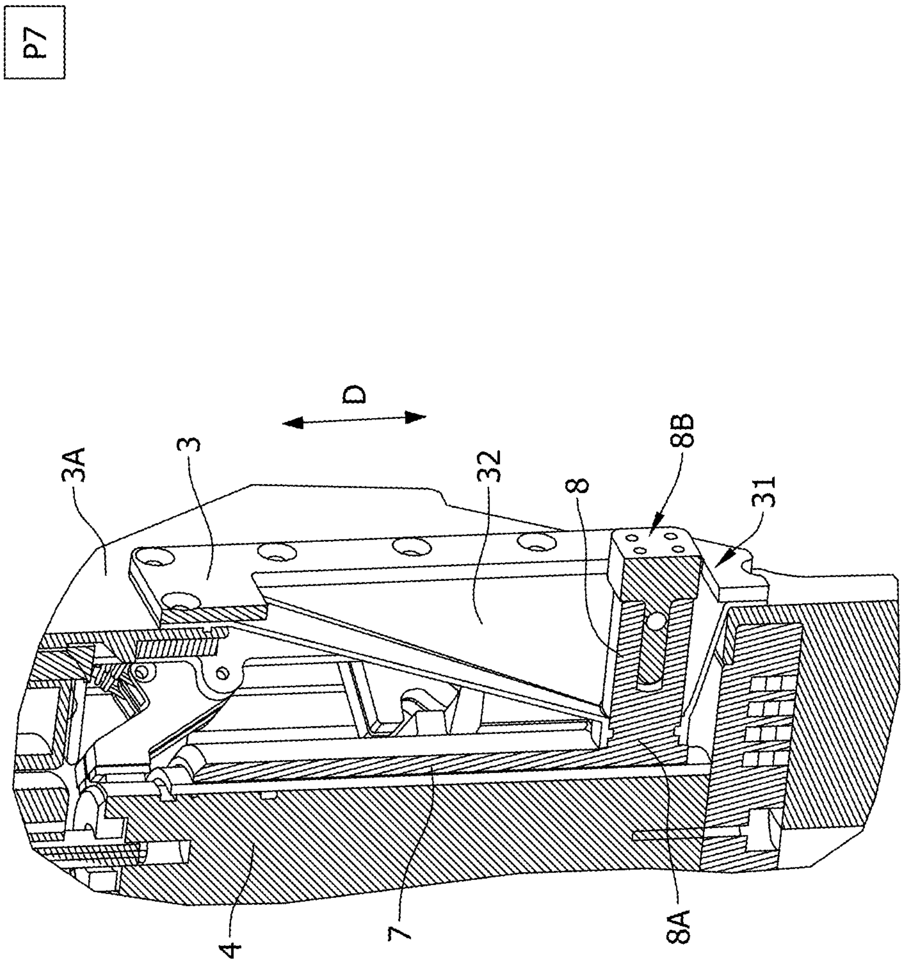
Figure 16:
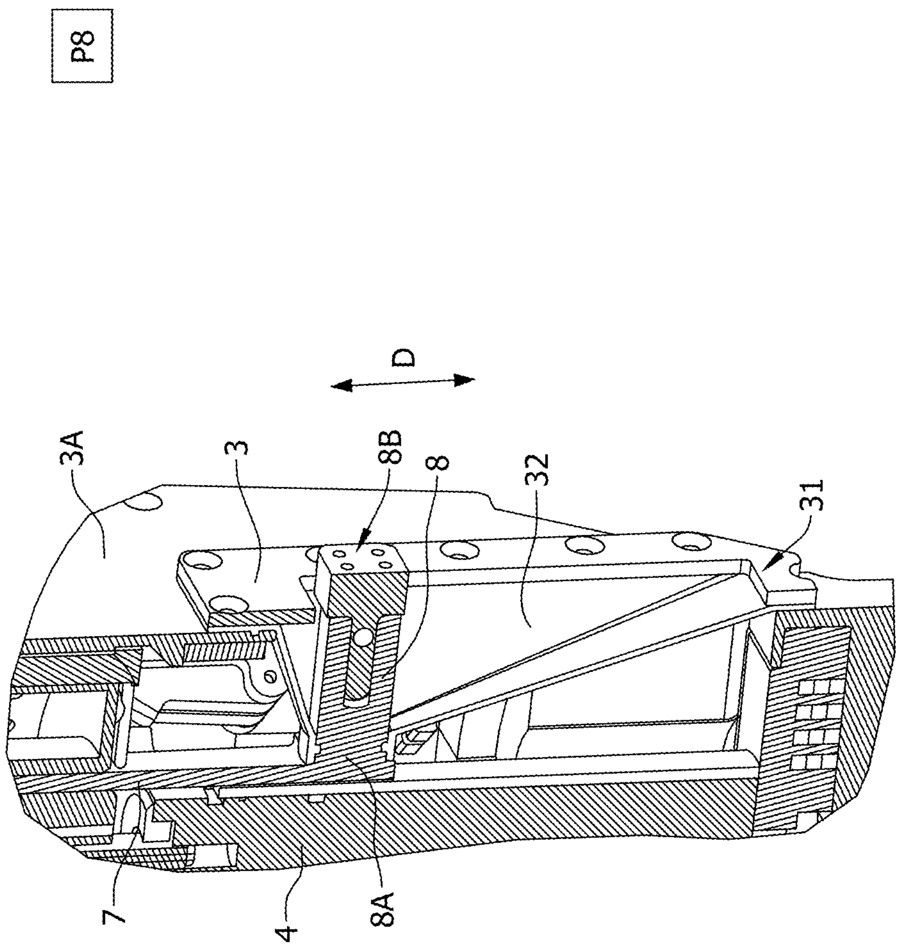

In the embodiments shown in FIGS. 11 and 14, the tripping means 63 includes a spring 631 coaxially arranged along a supporting pin 632 having opposite ends respectively coupled with the movable contact member 5 at a rotation axis R3 (parallel to the rotation axes R1, R2) and with the supporting frame 51 at another rotation axis R4 (parallel to the rotation axes R1, R2, R3). In this case, the above-mentioned deadlock position P0 can be defined as the rotation position of the movable contact member 5, in which the rotation axis R1 of the movable contact member 5 and the rotation axes R3, R4 of the opposite ends of the supporting pin 632 are aligned (FIGS. 6, 12).

According to an aspect of the present disclosure, the actuation member 7 includes one or more protrusions 70, 71, 72 that are suitably arranged to actuate each trip mechanism 6, more particularly the first lever 61 of each trip mechanism.

According to some embodiments of the present disclosure (FIGS. 1-18), the first lever 61 of each trip mechanism 6 includes a first arm 611 and a second arm 612 that are angularly spaced one from another along a reference plane parallel to the longitudinal axis 100.

In this case, the actuation member 7 includes, for each trip mechanism 6, an actuation protrusion 70 for coupling with the first lever 61.

The actuation protrusion 70 couples transiently to the first arm 611 of the first lever 61 to actuate this latter, when the actuation member 7 moves from the first actuation position P5 to the second actuation positions P6. In this case, the actuation force provided by the actuation member 7 moves the first lever 61 from the first rotation position P7 to the second rotation position P8.

The same actuation protrusion 70 couples transiently to the first arm 611 of the first lever 61 to actuate this latter, when the actuation member 7 moves from the second actuation position P6 to the first actuation positions P8. In this case, the actuation force provided by the actuation member 7 moves the first lever 61 from the second rotation position P8 to the first rotation position P7.

According to other embodiments of the present disclosure (FIGS. 19-21), the first lever 61 of each trip mechanism 6 includes a single free-standing arm for coupling the actuation member 7, which may be variously shaped (e.g. T-shaped).

In this case, the actuation member 7 includes, for each trip mechanism 6, a first actuation protrusion 71 and a second actuation protrusion 72 for coupling with the first lever 61.

The first and second protrusions 71, 72 are spaced one from another along the longitudinal axis 100, respectively in a proximal position and in a distal position relative to the first end 4A of the fixed contact member 4 (or, more specifically, the first end 35 of the outer casing 3).

The first actuation protrusion 71 couples transiently to the first lever 61 to actuate this latter, when the actuation member 7 moves from the first actuation position P5 to the second actuation positions P6. In this case, the actuation force provided by the actuation member 7 moves the first lever 61 from the first rotation position P7 to the second rotation position P8.

The second actuation protrusion 72 couples transiently to the first lever 61 to actuate this latter, when the actuation member 7 moves from the second actuation position P6 to the first actuation positions P8. In this case, the actuation force provided by the actuation member 7 moves the first lever 61 from the second rotation position P8 to the first rotation position P7.

According to an aspect of the present disclosure, each electric pole 2 includes deformable covering means 32, 33, 34 for obstructing a portion of the slot 31 of the outer casing 3 (which is not occupied by the motion transmission member 8), when the motion transmission member 8 takes different positions or moves along said slot.

Conveniently, the above-mentioned covering means 32, 33, 34 are driven by the motion transmission member 8, when this latter moves along the slot 31, upon actuation by the actuation means 9.

According to some embodiments of the present disclosure (FIG. 15-16), the above-mentioned covering means include a bellow membrane 32, which is coupled to the motion transmission member 8 and to the outer casing 3.

Different portions of the bellow membrane 32, which are arranged at opposite sides of the motion transmission member 8, are alternatively movable between an extended position and a folded position, upon a corresponding movement of the motion transmission member 8 along the slot 31 (motion direction D). When a portion of the foldable membrane 32 is in an extended position, it obstructs a corresponding side of the slot 31.

According to other embodiments of the present disclosure (FIG. 17-18), the above-mentioned covering means include a first plate 33, which has an end coupled to the motion transmission member 8 at a first side of this latter and the opposite end rotatably coupled to a support pin 38, and a second plate 34, which has an end coupled to the motion transmission member 8 and the opposite end rotatably coupled to the support pin 38.

The plates 33, 34 are movable between an extended position, at which they obstruct the slot 31 and a folded position, at which they are folded one on another, upon a corresponding movement D of the motion transmission member 8 along the slot 31. In this case, the slot 31 is obstructed by a third sliding plate 38A linearly movable along the slot 31 (direction D) and driven by the motion transmission member 8. The support pin 38 conveniently slides along a suitable guiding groove 39 obtained on an internal supporting wall 39A of the outer casing 3.

The operation of the switching apparatus 1 is now described in more details.

Opening Maneuver

The switching apparatus 1 is supposed to be in a closed condition (FIGS. 6-11, 19-20).

In this situation, each movable contact member 5 of each electric pole is in the coupled position P1 and it has its contact surface 5A coupled to a corresponding contact surface 4C of the fixed contact member 4. A current can therefore flow between the pole terminals 16, 17 of the electric pole.

The actuation member 7 of each electric pole is in the first actuation position P5 while each trip mechanism 6 of the electric pole is in the first trip position P3 with the first lever 61 in the first rotation position P7.

In order to carry out an opening maneuver, the actuation means 9 actuate the actuation member 7 of each electric pole from the first actuation position P5 to the second actuation position P6.

While travelling towards the second actuation position P6 by sliding along the fixed contact member 4, the actuation member 7 actuates each trip mechanism 6 and it causes this latter to trip from the first trip position P3 to the second trip position P4.

In particular, the first lever 61 of each trip mechanism 6 is actuated by a corresponding protrusion 70, 71 of the actuation member 7 and it moves from the first rotation position P7 to the second rotation position P8.

The second lever 62 of each trip mechanism 6 transmits an actuation force to the movable contact member 5, which starts moving from the coupled position P1 to the uncoupled position P2.

While each movable contact member 5 is travelling from the coupled position P1 towards the uncoupled position P2 upon the actuation force provided by the kinematic chain 61-62, as soon as the movable contact member 5 moves past a certain deadlock position P0, the tripping means 63 of each trip mechanism 6 provides an additional actuation force, which finally trips the movable contact member 5 to the uncoupled position P2.

The opening maneuver is thus completed (FIGS. 12-15, 21).

It is evidenced that while each movable contact member 5 is travelling towards the uncoupled position P2, a corresponding insulating portion 7A of the actuation member 7 (which travels towards the second actuation position P6) interposes between the contact surface 5A of the movable contact member 5 and the corresponding contact surface 4C of the fixed contact member 4, thereby favoring the quenching of possible electric arcs raising between the electric contacts under separation.

Closing Maneuver

The switching apparatus 1 is supposed to be in an open condition (FIGS. 12-15, 21).

In this situation, each movable contact member 5 of each electric pole is in the uncoupled position P2 and it has its contact surface 5A separated from a corresponding contact surface 4C of the fixed contact member 4. No current can therefore flow between the pole terminals 16, 17 of the electric pole.

The actuation member 7 of each electric pole is in the second actuation position P6 while each trip mechanism 6 of the electric pole is in the second trip position P4 with the first lever 61 in the second rotation position P8.

In order to carry out a closing maneuver, the actuation means 9 actuate the actuation member 7 of each electric pole from the second actuation position P6 to the first actuation position P5.

While travelling towards the first actuation position P5 by sliding along the fixed contact member 4, the actuation member 7 actuates each trip mechanism 6 and it causes this latter to trip from the second trip position P4 to the first trip position P3.

In particular, the first lever 61 of each trip mechanism 6 is actuated by a corresponding protrusion 70, 72 of the actuation member 7 and it moves from the second rotation position P8 to the first rotation position P7.

The second lever 62 of each trip mechanism 6 transmits an actuation force to the movable contact member 5, which starts moving from the uncoupled position P2 to the coupled position P1.

While each movable contact member 5 is travelling from the uncoupled position P2 towards the coupled position P1 upon the actuation force provided by the kinematic chain 61-62, as soon as the movable contact member 5 moves past the deadlock position P0, the tripping means 63 of each trip mechanism 6 provides an additional actuation force, which finally trips the movable contact member 5 to the coupled position P1.

The closing maneuver is thus completed (FIGS. 6-11, 19-20).

The switching apparatus 1, according to the present disclosure, offers remarkable advantages over the prior art.

Thanks to the particular configuration of the breaking components (the fixed contact member 4, the movable contact members 5 and the actuating chain for moving each movable contact member), the switching apparatus 1 shows an excellent switching efficiency and provides excellent performances in terms of interruption ratings during the opening maneuvers.

Differently from traditional switching apparatuses, the switching apparatus 1 can efficiently operate DC currents even when operating at relatively high voltages (e.g. above 1 kV). In particular, the interposition of insulating portions 7A of the actuation member 7 between the electric contacts 5A, 4C under separation allows achieving outstanding performances in terms of arc quenching.

The switching apparatus 1 is therefore capable of operating at high current levels, thereby showing improved switching performances when short-circuit currents need to be interrupted.

The switching apparatus 1 includes electric poles with an optimized layout of the internal components, which allows limiting overall size and reducing manufacturing costs.

The switching apparatus 1 is thus characterized by a very compact structure and it is particularly simple and cheap to manufacture at industrial level.

The switching apparatus 1 has a simple and robust structure, which is particularly suitable for installation in a LV or MV electric grid.

The invention claimed is:

1. A switching apparatus for low or medium voltage electric power distribution grids, said switching apparatus comprising one or more electric poles, wherein said one or more electric poles comprise:

an outer casing made of electrically insulating material and defining an internal volume of said one or more electric poles;

a fixed contact assembly accommodated in the internal volume of said one or more electric poles and comprising a fixed contact member formed by an electrically conductive tubular element extending along a longitudinal axis of said one or more electric poles; and a movable contact assembly accommodated in the internal volume of said one or more electric poles and hanging laterally relative to said fixed contact member, wherein said movable contact assembly comprises a movable contact member, said movable contact member reversibly movable, about a first rotation axis, between a coupled position, at which a first contact surface of said movable contact member is coupled with a corresponding second contact surface of said fixed contact member, and an uncoupled position, at which the first contact surface of said movable contact member is separated from the corresponding second contact surface of said fixed contact member, wherein said movable contact assembly further comprises at least a trip mechanism coupled to at least said movable contact member, said trip mechanism reversibly movable between a first trip position and a second trip position, wherein said trip mechanism moves said movable contact member from said coupled position to said uncoupled position when said trip mechanism moves from said first trip position to said second trip position upon receiving an actuation force, wherein said trip mechanism moves said movable contact member from said uncoupled position to said coupled position when said trip mechanism moves from said second trip position to said first trip position upon receiving the actuation force, wherein said one or more electric poles further comprise an actuation member accommodated in the internal volume of said one or more electric poles and formed by an electrically insulating hollow tubular element arranged coaxially and externally relative to said fixed contact member, so that said fixed contact member passes through said actuation member along said longitudinal axis, wherein said actuation member is slidingly movable along said fixed contact member, wherein said actuation member is reversibly movable between a first actuation position and a second actuation position by sliding along said fixed contact member, and wherein said actuation member transiently couples to said trip mechanism to actuate said trip mechanism between said first and second trip positions, when said actuation member moves between said first and second actuation positions.

2. The switching apparatus according to claim 1, wherein:

said actuation member transiently couples to said trip mechanism and provides the actuation force to move said trip mechanism from said first trip position to said second trip position, when said actuation member moves from said first actuation position to said second actuation position, and said actuation member transiently couples to said trip mechanism and provides the actuation force to move said trip mechanism from said second trip position to said first trip position, when said actuation member moves from said second actuation position to said first actuation position.

3. The switching apparatus according to claim 1, wherein an insulating portion of said actuation member is interposed between said first contact surface of said movable contact member and a corresponding contact surface of said fixed contact member, when said actuation member is in said second actuation position.

4. The switching apparatus according to claim 1, further comprising an actuator for actuating the actuation member of said one or more electric poles.

5. The switching apparatus according to claim 4, wherein said one or more electric poles further comprise a motion transmission member coupled to said actuator and coupled to said actuation member to transmit the actuation force to said actuation member.

6. The switching apparatus according to claim 5, wherein said motion transmission member passes through a slot of said outer casing, and wherein said one or more electric poles further comprise deformable covering driven by said motion transmission member for obstructing a portion of said slot, which is not occupied by said motion transmission member.

7. The switching apparatus according to claim 1, wherein said trip mechanism comprises a kinematic chain including:

a first lever reversibly movable about a second rotation axis and arranged in such a way to be actuated by said actuation member, when said actuation member moves between said first and second actuation positions; and a second lever coupled to said first lever and to said movable contact member, said second lever transmitting the actuation force to said movable contact member to move said movable contact member between said coupled and uncoupled positions, when said first lever is actuated by said actuation member.

8. The switching apparatus according to claim 7, wherein said first lever comprises a first arm and a second arm that are angularly spaced one from another along a reference plane parallel to said longitudinal axis, wherein said actuation member comprises an actuation protrusion for coupling with said first lever, wherein said actuation protrusion transiently couples to said first arm to actuate said first lever, when said actuation member moves from said first actuation position to said second actuation position, and wherein said actuation protrusion transiently couples to said second arm to actuate said first lever, when said actuation member moves from said second actuation position to said first actuation position.

9. The switching apparatus according to claim 7, wherein said first lever comprises a first arm and a second arm that are angularly spaced one from another along a reference plane parallel to said longitudinal axis, wherein said actuation member comprises a first actuation protrusion and a second actuation protrusion for coupling with said first lever, said first and second actuation protrusions being spaced one from another along said longitudinal axis, wherein said first actuation protrusion transiently couples to said first arm to actuate said first lever, when said actuation member moves from said first actuation position to said second actuation position, and wherein said second actuation protrusion transiently couples to said second arm to actuate said first lever, when said actuation member moves from said second actuation position to said first actuation position.

10. The switching apparatus according to claim 1, wherein said trip mechanism comprises a mechanism for providing the actuation force to trip said movable contact member towards said coupled position or towards said uncoupled position, when said movable contact member moves past a deadlock position, while travelling between said coupled and uncoupled positions.

11. The switching apparatus according to claim 1, wherein said one or more electric poles comprise a plurality of movable contact assemblies equally spaced around said fixed contact member.

12. The switching apparatus according to claim 1, wherein said movable contact assembly comprises a pair of movable contact members movable in parallel around a same first rotation axis.

13. The switching apparatus according to claim 1, wherein said movable contact assembly comprises a single movable contact member movable around a corresponding first rotation axis.

14. The switching apparatus according to claim 1, wherein said movable contact assembly comprises at least two movable contact members and a corresponding trip mechanism for each of said movable contact members.

15. The switching apparatus according to claim 1, wherein said movable contact assembly further comprises a supporting frame to hold in position said movable contact member and said trip mechanism of said movable contact assembly, said supporting frame being fixed to a supporting structure fixed to said outer casing.

* * * * *